(12) United States Patent
Brinig et al.

(10) Patent No.: US 11,605,246 B2
(45) Date of Patent: Mar. 14, 2023

(54) PROGRAMMATICALLY DETERMINING LOCATION INFORMATION IN CONNECTION WITH A TRANSPORT SERVICE

(71) Applicant: Uber Technologies, Inc., San Francisco, CA (US)

(72) Inventors: Kevin Brinig, San Francisco, CA (US); Daniel Heller, San Francisco, CA (US); Todd Sifleet, San Francisco, CA (US); Jyothidhar Pulakunta, Fremont, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 17/370,853

(22) Filed: Jul. 8, 2021

(65) Prior Publication Data

US 2021/0335056 A1    Oct. 28, 2021

Related U.S. Application Data

(63) Continuation of application No. 16/676,251, filed on Nov. 6, 2019, now Pat. No. 11,080,944, which is a
(Continued)

(51) Int. Cl.
*H04W 4/02* (2018.01)
*G06Q 10/00* (2012.01)
(Continued)

(52) U.S. Cl.
CPC ............. *G07B 13/06* (2013.01); *G01C 21/26* (2013.01); *G01C 21/3438* (2013.01);
(Continued)

(58) Field of Classification Search
None
See application file for complete search history.

(56) References Cited

U.S. PATENT DOCUMENTS

| 4,750,197 | A | 6/1988 | Denekamp |
| 6,195,648 | B1 | 2/2001 | Simon |

(Continued)

FOREIGN PATENT DOCUMENTS

| EP | 1156462 | 11/2005 |
| EP | 2767962 | 8/2014 |

(Continued)

OTHER PUBLICATIONS

International Search Report and Written Opinion in PCT/US2016/026799 dated Jul. 28, 2016.
(Continued)

*Primary Examiner* — Adam D Tissot
(74) *Attorney, Agent, or Firm* — Mahamedi IP Law LLP

(57) ABSTRACT

A computing system receives location data from a computing device of a transport provider and based on the location data, monitors a location of the transport provider as the transport provider operates a vehicle to travel towards a service location of the service request. The system determines, based on monitoring the location of the transport provider, that the transport provider has not indicated at least one of a correct start location or a correct start time for fulfilling the service request. In response to determining that the transport provider has not indicated the at least one of the correct start location or the correct start time, the system uses a set of the location data received from the computing device of the transport provider to determine the at least one of the correct start location or the correct start time for fulfilling the service request.

20 Claims, 8 Drawing Sheets

Related U.S. Application Data continuation of application No. 15/689,971, filed on Aug. 29, 2017, now Pat. No. 10,482,684, which is a continuation of application No. 15/017,278, filed on Feb. 5, 2016, now Pat. No. 9,852,551.

(60) Provisional application No. 62/112,287, filed on Feb. 5, 2015.

(51) Int. Cl.
    *G06Q 50/30*      (2012.01)
    *G07B 13/06*      (2006.01)
    *G07B 13/10*      (2006.01)
    *G07B 15/02*      (2011.01)
    *G01S 5/00*      (2006.01)
    *G01C 21/34*      (2006.01)
    *G01C 21/26*      (2006.01)
    *G01S 19/42*      (2010.01)

(52) U.S. Cl.
CPC ............ *G01S 5/0027* (2013.01); *G01S 19/42* (2013.01); *G07B 13/10* (2013.01); *G07B 15/02* (2013.01)

(56) References Cited

U.S. PATENT DOCUMENTS

| | | |
|---|---|---|
| 6,263,435 B1 | 7/2001 | Dondeti |
| 6,378,072 B1 | 4/2002 | Collins |
| 6,646,604 B2 | 11/2003 | Anderson |
| 7,113,864 B2 | 9/2006 | Smith et al. |
| 8,010,285 B1 | 8/2011 | Denise |
| 8,417,448 B1 | 4/2013 | O'Herlihy |
| 8,417,449 B1 | 4/2013 | Denise |
| 8,538,158 B1 | 9/2013 | Denise |
| 8,554,468 B1 | 11/2013 | Bullock |
| 8,670,930 B1 | 3/2014 | Denise |
| 8,718,926 B1 | 5/2014 | Denise |
| 8,762,048 B2 * | 6/2014 | Kosseifi ............. G01C 21/3415 701/410 |
| 8,779,941 B2 | 7/2014 | Amir |
| 8,915,738 B2 | 12/2014 | Mannino |
| 8,924,240 B2 | 12/2014 | Depura et al. |
| 8,934,719 B1 | 1/2015 | Denise |
| 9,097,545 B1 | 8/2015 | Denise |
| 9,261,376 B2 | 2/2016 | Zheng |
| 9,898,759 B2 | 2/2018 | Khoury |
| 10,009,306 B2 | 6/2018 | Garg |
| 10,129,221 B1 | 11/2018 | McClendon |
| 2003/0194991 A1 | 10/2003 | Gilmour |
| 2004/0093280 A1 | 5/2004 | Yamaguchi |
| 2004/0106399 A1 | 6/2004 | Ki |
| 2004/0146047 A1 | 7/2004 | Turcan |
| 2005/0131597 A1 | 6/2005 | Raz |
| 2005/0258234 A1 | 11/2005 | Silverbrook |
| 2006/0259837 A1 | 11/2006 | Teranishi |
| 2007/0236366 A1 | 10/2007 | Gur |
| 2008/0030376 A1 | 2/2008 | Tunnell |
| 2008/0186210 A1 | 8/2008 | Tseng |
| 2008/0252412 A1 | 10/2008 | Larrson |
| 2008/0255722 A1 | 10/2008 | McClellan |
| 2008/0270204 A1 | 10/2008 | Poykko |
| 2008/0277183 A1 | 11/2008 | Huang |
| 2009/0088924 A1 * | 4/2009 | Coffee ............... B28C 7/028 701/31.4 |
| 2009/0192851 A1 * | 7/2009 | Bishop ............... G06Q 30/08 705/335 |
| 2009/0234552 A1 | 9/2009 | Takeda |
| 2010/0020170 A1 | 1/2010 | Higgins-Luthman |
| 2010/0136994 A1 | 6/2010 | Taylor |
| 2011/0000747 A1 | 1/2011 | Wu |
| 2011/0153629 A1 | 6/2011 | Lehmann |
| 2011/0301806 A1 | 12/2011 | Messier |
| 2011/0301985 A1 * | 12/2011 | Camp ............... G06Q 50/30 705/7.29 |
| 2012/0174111 A1 | 7/2012 | Pala |
| 2012/0191343 A1 | 7/2012 | Haleem |
| 2012/0197416 A1 | 8/2012 | Taira |
| 2012/0203428 A1 | 8/2012 | Choi |
| 2012/0226391 A1 | 9/2012 | Fryer |
| 2012/0232741 A1 | 9/2012 | Sekiyama |
| 2012/0232943 A1 * | 9/2012 | Myr ............... G08G 1/202 705/7.13 |
| 2012/0283893 A1 | 11/2012 | Lee |
| 2013/0005414 A1 | 1/2013 | Gurbrinder et al. |
| 2013/0024060 A1 | 1/2013 | Sukkarie |
| 2013/0063607 A1 | 3/2013 | Shimotono |
| 2013/0066688 A1 | 3/2013 | Pinkus |
| 2013/0147620 A1 | 6/2013 | Becker |
| 2013/0204526 A1 | 8/2013 | Boschker |
| 2013/0226622 A1 | 8/2013 | Adamson |
| 2013/0234724 A1 | 9/2013 | Kabasawa |
| 2013/0246301 A1 | 9/2013 | Radhakrishnan |
| 2013/0311081 A1 | 11/2013 | Yamakawa |
| 2013/0345961 A1 | 12/2013 | Leader |
| 2014/0051465 A1 * | 2/2014 | Ruys ............... G01C 21/3676 455/457 |
| 2014/0067434 A1 | 3/2014 | Bourne et al. |
| 2014/0067488 A1 | 3/2014 | James et al. |
| 2014/0067489 A1 | 3/2014 | James |
| 2014/0067491 A1 | 3/2014 | James |
| 2014/0074757 A1 | 3/2014 | De Gennaro |
| 2014/0082069 A1 | 3/2014 | Varoglu et al. |
| 2014/0089202 A1 | 3/2014 | Bond |
| 2014/0129951 A1 * | 5/2014 | Amin ............... G06Q 30/0635 715/738 |
| 2014/0189888 A1 | 7/2014 | Madhok |
| 2014/0207342 A1 | 7/2014 | Chen et al. |
| 2014/0270096 A1 | 9/2014 | Ashizuka |
| 2014/0278616 A1 | 9/2014 | Stone |
| 2014/0278838 A1 | 9/2014 | Novak |
| 2014/0322676 A1 | 10/2014 | Raman |
| 2014/0358376 A1 | 12/2014 | Phelan |
| 2014/0358745 A1 | 12/2014 | Lunan |
| 2014/0380264 A1 | 12/2014 | Misra |
| 2015/0012341 A1 | 1/2015 | Amin |
| 2015/0033305 A1 | 1/2015 | Shear |
| 2015/0081362 A1 | 3/2015 | Chadwick et al. |
| 2015/0091713 A1 | 4/2015 | Kohlenberg |
| 2015/0095235 A1 | 4/2015 | Dua |
| 2015/0100505 A1 | 4/2015 | Binion |
| 2015/0106900 A1 | 4/2015 | Pinski |
| 2015/0113622 A1 | 4/2015 | Dua |
| 2015/0206267 A1 | 7/2015 | Khanna |
| 2015/0223024 A1 | 8/2015 | Abuodeh |
| 2015/0254581 A1 * | 9/2015 | Brahme ............... G06Q 10/02 705/5 |
| 2015/0266455 A1 | 9/2015 | Wilson |
| 2015/0279213 A1 | 10/2015 | Balter |
| 2015/0293234 A1 * | 10/2015 | Snyder ............... G01S 19/21 342/357.59 |
| 2015/0302342 A1 | 10/2015 | Yeh |
| 2015/0307107 A1 | 10/2015 | Tamari |
| 2015/0324379 A1 | 11/2015 | Danovitz |
| 2015/0348221 A1 * | 12/2015 | Pedersen ............ G06Q 10/0639 705/7.38 |
| 2016/0016473 A1 | 1/2016 | Van Wiemeersch |
| 2016/0161275 A1 | 6/2016 | Waltermann |
| 2016/0232719 A1 | 8/2016 | Brinig |
| 2016/0337294 A1 * | 11/2016 | Garg ............... G06Q 30/0284 |
| 2016/0358388 A1 | 12/2016 | Skoglund |
| 2016/0373473 A1 * | 12/2016 | Truong ............... G01C 21/28 |
| 2017/0039890 A1 | 2/2017 | Truong |
| 2017/0086051 A1 | 3/2017 | Truong |
| 2017/0132540 A1 | 5/2017 | Haparnas |
| 2017/0200061 A1 | 7/2017 | Julian |
| 2017/0303110 A1 | 10/2017 | Truong |
| 2017/0328725 A1 | 11/2017 | Schlesinger |
| 2017/0358146 A1 | 12/2017 | Brinig |
| 2017/0358147 A1 | 12/2017 | Brinig |
| 2017/0371608 A1 | 12/2017 | Wasserman |
| 2017/0372534 A1 | 12/2017 | Steketee |

(56) References Cited

U.S. PATENT DOCUMENTS

| | | | |
|---|---|---|---|
| 2018/0047091 A1 | 2/2018 | Ogden | |
| 2018/0086347 A1 | 3/2018 | Shaikh | |
| 2018/0089605 A1 | 3/2018 | Poornachandran | |
| 2018/0109935 A1 | 4/2018 | Truong | |
| 2018/0227258 A1 | 8/2018 | Garg | |
| 2018/0238705 A1 | 8/2018 | O'Herlihy | |
| 2019/0028444 A1 | 1/2019 | McClendan | |
| 2019/0048642 A1 | 2/2019 | Truong | |
| 2019/0139450 A1 | 5/2019 | Truong | |
| 2019/0265064 A1 | 8/2019 | Koenig | |
| 2019/0271556 A1 | 9/2019 | O'Herlihy | |
| 2020/0074752 A1 | 3/2020 | Brinig | |
| 2020/0209857 A1 | 7/2020 | Djuric | |
| 2020/0219330 A1 | 7/2020 | Brinig | |
| 2021/0248273 A1 | 8/2021 | Gupta | |

FOREIGN PATENT DOCUMENTS

| | | |
|---|---|---|
| EP | 2700063 | 6/2015 |
| JP | 2014-075727 | 4/2014 |
| JP | 2014-130552 | 6/2014 |
| KR | 10-2011-0024979 | 3/2011 |
| KR | 10-2013-0082834 | 7/2013 |
| KR | 10-2014-0124137 | 10/2014 |
| KR | 10-2014-1452478 | 10/2014 |
| KR | 10-2015-0057165 | 5/2015 |
| WO | WO 2012051359 | 4/2012 |
| WO | WO2012080741 A1 | 6/2012 |

OTHER PUBLICATIONS

International Search report in PCT/US2016/016858 dated May 19, 2016.
IPRP in PCT/2016/016858 dated Aug. 17, 2017.
International Search Report and Written Opinion in PCT/US2017/037421 dated Aug. 31, 2017.
IPRP in PCT/US2016/026799 dated Oct. 17, 2017.
Written Opinion issued in SG 11201708199T dated May 7, 2018.
IPRP in PCT/US2017/037421 dated Dec. 27, 2018.
Scott Grimmer, I Got Scammed by an Uber Driver and Customer Service Did What? May 20, 2016.
Examination Report No. 1 in AU 2016215092 dated Nov. 26, 2019.
EESR in EP 17813998.6 dated Jan. 22, 2020.
Examination Report No. 1 in AU 2016246064 dated May 4, 2020.
Pre-Examination Report dated Jul. 30, 2020 in BR 112017016820-0.
Office Action in CA 3027508 dated Dec. 9, 2020.
EESR in EP 21156676.5 dated Jul. 1, 2021.
Exam Report No. 1 dated May 3, 2022 in AU 2017286467.
Pre-Examination Report dated Aug. 4, 2020 in BR 112017024473-0.
Office Action dated Jul. 23, 2021 in CA 2,989,819.

\* cited by examiner

PROGRAMMATICALLY DETERMINING LOCATION INFORMATION IN CONNECTION WITH A TRANSPORT SERVICE

RELATED APPLICATIONS

This application is a continuation of U.S. patent application Ser. No. 16/676,251, filed on Nov. 6, 2019; which is a continuation of U.S. patent application Ser. No. 15/689,971, filed on Aug. 29, 2017 (now U.S. Pat. No. 10,482,684); which is a continuation of U.S. patent application Ser. No. 15/017,278, filed on Feb. 5, 2016 (now U.S. Pat. No. 9,852,551); which claims the benefit of U.S. Provisional Patent Application No. 62/112,287, filed on Feb. 5, 2015; the aforementioned applications being hereby incorporated by reference in their entireties.

BACKGROUND

A service arrangement system can arrange an on-demand service, such as a transport service, to be performed by a service provider for a requesting user through the use of mobile computing devices. During the progress of the transport service, the service arrangement system can communicate with a mobile computing device of the service provider to determine its location for purpose of determining the route traveled by the service provider in performing the transport service. The service arrangement system can use information about the route to determine an amount for the transport service.

DETAILED DESCRIPTION

Figure 1A:
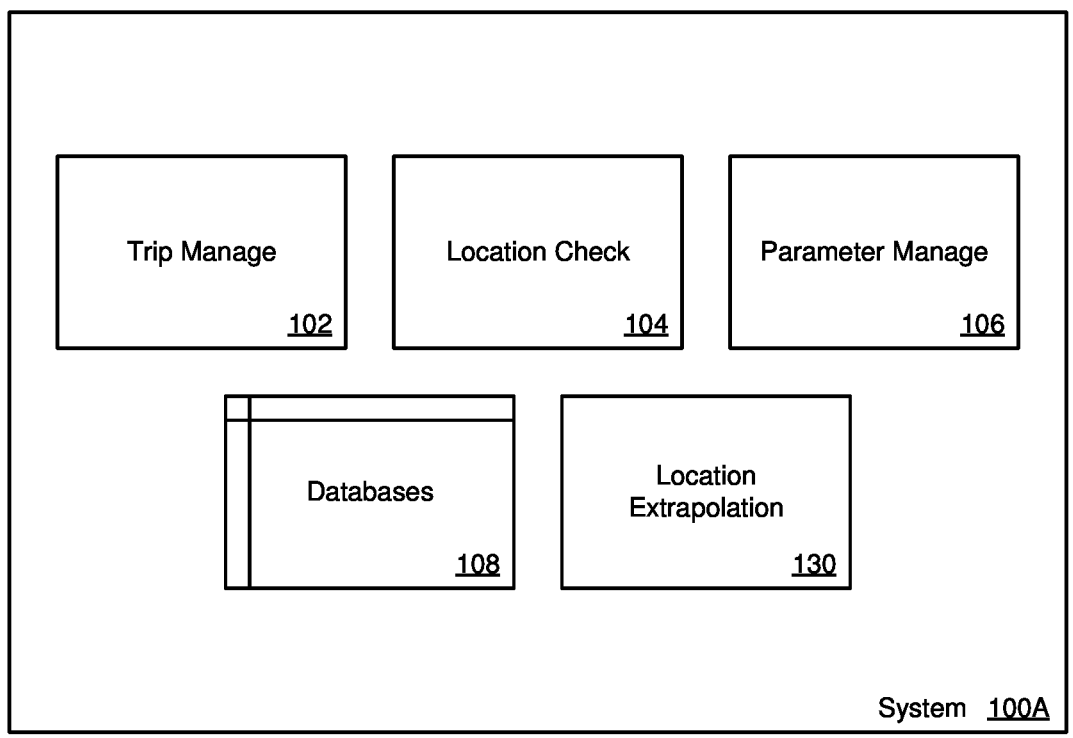
FIGS. 1A and 1B illustrate example systems to programmatically determine location information in connection with a transport service.

According to examples, a system described herein can track the progress of a transport service (also referred to as a "trip") that is provided by a driver and can store information about the transport service in a record. The system can programmatically determine if a start location of the transport service is incorrect based on data, including location information, received from the driver's device. For example, the system can determine that a driver has failed to indicate that the transport service has started at the appropriate location and/or time. In such an example, the system can access the previous location information received from the driver's device and/or the associated timing information of the previous location information to programmatically identify a particular previous location as being the start location of the transport service. In this manner, the system can provide a mechanism to determine an approximate start location and/or start time for the transport service as though the driver had appropriately indicated the correct start location of the transport service.

In examples described herein, the system can be implemented on a computing device or system, or a set of computing devices or systems. In one example, one or more components of the system can be implemented on a backend server(s) or on a mobile computing device of a driver (referred to herein as a driver device). For example, an application running on a driver device can receive information about a transport service the driver is to provide for a rider/passenger from a service arrangement system. The information can include pickup location information corresponding to the pickup location of the rider, such as an address (as a text string) and/or a geo-coordinate, such as a latitude and a longitude of a coordinate system (referred to herein as a location data point). The system can track the driver's location in connection with the transport service (e.g., track the driver device location) based on location information obtained by the application. For example, the application can periodically determine the current location data point of the driver device by using a global positioning system (GPS) receiver of the driver device. The application can store the determined location data points in a record/entry in a memory resource of the driver device and/or can periodically transmit the location data points to the service arrangement system.

As the driver changes position (e.g., travels to the pickup location of the rider and subsequently travels to the destination of the rider), the system can determine when and where the driver is located when the driver provides input indicating that the transport service has begun. If the system determines that the driver has indicated an incorrect start location of the transport service, the system can programmatically determine the appropriate start location of the transport service by accessing the previously determined location data points of the driver device and designating a previous location data point as the start location of the transport service.

For example, after the driver accepts an invitation to provide the transport service for the rider, the system can determine when the driver device is within a first distance (e.g., point to point distance, or haversine distance) or alternatively, a first estimated travel time away from (or estimated time of arrival to) the pickup location data point (e.g., the geo-coordinate corresponding to the pickup location). This can indicate to the system that the driver is approaching or has approached the vicinity of the pickup location (e.g., and that a pickup of the rider was reasonably possible). At a later time, the system can determine when the driver device is more than a second distance or second estimated travel time away from the pickup location. Subsequently, if the driver then provides a user input to indicate that the transport service has begun, when in fact, the transport service may have begun much earlier (e.g., the driver picked up the rider at a much earlier time) and at a previous location (as opposed to the current location of the driver when the user input was provided), the system can provide the driver with an opportunity to specify the correct start location of the transport service via one or more user interfaces.

In other words, for example, such a user interface may be displayed on the driver application only when the specified threshold distance and/or time conditions are satisfied (e.g., the driver was a first distance or first estimated travel time away from the pickup location, the driver was subsequently at least a second distance or a second estimated travel time away from the pickup location, and the driver subsequently provided input on the driver application to indicate that the transport service has begun). If the driver then provides user input indicating that the transport service was started late (e.g., the transport service had actually begun at or near the pickup location as opposed to the driver's current location), the system can identify a particular previous location data point to designate as the start location. In this manner, the system can "rewind" the start location and/or start time.

According to an example, in order to determine the appropriate start location, the system can determine a set of location data points of the driver device previously determined in connection with the transport service, and select a location data point from the set to designate as the start location. The system can identify the set of location data points by determining which location data points (i) are within the first distance or first estimated travel time away from the pickup location, (ii) are within the second distance or second estimated travel time away from the pickup location, (iii) have timestamps between a first time when the driver device was determined to be within the first distance or first estimated travel time away from the pickup location and a second time when the driver device was determined to be more than a second distance or second estimated travel time away from the pickup location, and/or (iv) are substantially identical or equal to each other. As described herein, in some examples, two location data points can be determined to be substantially identical to each other when their respective latitudes and longitudes are substantially equal to each other and/or when they are at least within a specified distance from each other (e.g., a certain distance measurement from each other, a certain decimal value of a latitude and/or a certain decimal value of a longitude from each other, etc.). Such a set of location data points can indicate to the system that the driver device was stationary for a period of time because the driver was waiting for the rider to enter the vehicle. From this set of location data points, the system can then select a location data point having the most recent timestamp and designate the location data point to be the start location of the transport service.

Still further, the system can maintain an entry or a record corresponding to the transport service for at least the duration of the transport service and can store the identified location as the start location of the transport service, along with the associated timestamp, in the entry. From the time the driver provides the user input indicating that the transport service has begun, the system can store the periodically determined location data points in the entry until the driver indicates (e.g., via user input) that the transport service has been completed, or alternatively, until the system determines through programmatic means that the transport service has been completed. The system can also identify an additional set of location data points of the driver device previously determined as being associated with the performance of the transport service. This set of location data points can correspond to those points determined between a time after the timestamp of the determined start location to the time the driver provided the user input. In this manner, the system can provide a complete record of the location data points (and associated times) corresponding to the performance of the transport service, e.g., from when the transport service approximately began until its completion. A complete record can provide the most accurate depiction or representation of the transport service for fare determination purposes.

Among other benefits and technical effect, examples herein provide a programmatic mechanism to flag or correct inaccuracies in trip data while the trip is in progress. Examples contemplate that, in connection with the service arrangement system, tens or hundreds of thousands of trips may be provided daily or weekly worldwide, and that a significant number of them may be subject to inaccurate trip data as a result of drivers incorrectly indicating the start of a respective trip for a respective rider. Not only would it be extremely difficult, if not impossible, for an administrative individual (e.g., administrative employee or user of the service arrangement system or network service) to timely determine when a trip data inaccuracy actually occurs for a given trip, but it would be impossible for that individual to correct such an inaccuracy before the completion of the trip, let alone correct the trip data inaccuracies in hundreds or thousands of trips in a short amount of time.

Still further, because the service arrangement system computes the cost or amount for an individual trip based on the trip data within a short time after the trip is completed (e.g., within a minute or two) and causes the rider's payment method to be charged accordingly, it is preferable to correct inaccuracies in trip data before the amount for the trip is computed. Trip inaccuracies can result in a rider being undercharged, but more importantly, may require the individual driver and/or an administrative user to retroactively guess what the correct trip data should be. Examples described herein can provide individual drivers an opportunity, under certain conditions, to inform the system to flag and/or correct trip data, and the system can programmatically determine the appropriate start data. As such, the system can provide a remedy for individual drivers to receive the fair and accurate compensation of services rendered, and can eliminate the inefficiencies and inaccuracies of retroactively correcting the trip data.

According to some examples, a network service operates with numerous user devices, which collectively provide a platform in which user devices serve as both information sources and devices through which offerings of the network service are implemented. In this regard, mobile computing devices and other user operated devices may have a role as information source, from which the network service can gather information and implement service functionality more effectively. In some examples described, the role may be implemented through an application that runs on the mobile computing device, for purpose of extracting information for, and/or receiving information from the network service, and implementing functionality of the network service through the mobile computing device, under control of the network service.

Further, as information sources, the user devices can have anonymization functionality, adapted for varying levels, to enable protection of user privacy. Such technology can be implemented through the service application to protect information such as the user's identity and position. In this way, the user device can execute the service application to access resources of the user's mobile computing device (e.g., GPS component) and transmit outgoing data to the network service with anonymization. For example, each user computing device can communicate the user's location to the network service (e.g., through GPS), along with a unique user identifier which only the network service can pair with a user account. Such functionality enables the network service to control distribution of information about a user, based on triggers and type of information required. For example, before a rider is picked up, a driver assigned for a transport request, and no one else, receives information for the pickup, such as the pickup location (which may be selected by the rider and may also be different from the current location of the rider), and the first name of the rider. Likewise, the rider may receive information about the current location of the driver as he progresses to the driver, but only when the arrangement for transport is made. The rider may also receive an image and first name for the driver.

As with any service where there are many users, there can be misuse, and examples as described can implement the service functionality to reduce or eliminate actions either rider or user can perform to misuse the network service. For example, the service application may execute transparently to access the GPS component of each user device, in order to communicate data that cannot, for example, be altered in timing (e.g., when such data is communicated) or accuracy (e.g., the actual location as reported by the GPS component). With respect to many examples described, misuse can result in inefficiency of the network service, and this can impact both network side computers and user operated devices. In accuracies in trip data can, for example, increase the load on the network service because either the rider or driver would request a correction when a mistake occurs, and such correction would require use of service side operators and/or additional programmatic resources. When expanded over a population of users, the incidents of misuse can limit the number of users, and thus limit the number of user devices that are operating as information sources. More generally, human-error is a fundamental problem in any computing environment, and real-time on-demand services provide a particular challenge because the user (whether rider or driver) is operating in the real-world, where a user action or inaction that is the cause of the error is not a direct interaction with a computer (e.g., missed key entry). In this regard, examples utilize technology, in the form of network servers and/or user computer devices to provide a technological solution for addressing human-error with respect to a network service.

As used herein, a client device, a driver device, a computing device, and/or a mobile computing device refer to devices corresponding to desktop computers, cellular devices or smartphones, personal digital assistants (PDAs), laptop computers, tablet devices, etc., that can provide network connectivity and processing resources for communicating with a remote system(s) over one or more networks, such as a service arrangement system. In one example, a driver device can also correspond to custom hardware of a vehicle, such as an in-vehicle computing device, that has network connectivity and location-determination capabilities.

Still further, examples described herein relate to a variety of location-based (and/or on-demand) services, such as a transport service, a food truck service, a delivery service, an entertainment service, etc. to be arranged between users and service providers. In other examples, a service arrangement system can be implemented by any entity that provides goods or services for purchase through the use of computing devices and network(s). For purpose of simplicity, in examples described herein, the service arrangement system can correspond to a transport arrangement system that arranges transport services to be provided for riders by drivers of vehicles.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1A illustrates an example system to programmatically determine location information in connection with a transport service. Depending on variations, FIG. 1A can be implemented by and operated on a computing device and/or computing system, or on a number of computing devices and/or computing systems. According to an example of FIG. 1A, the system 100A can include a trip manage component 102, a location check component 104, a parameter manage component 106, one or more databases 108, and a location extrapolation 130. For purpose of simplicity, other components of the system 100A are not illustrated in FIG. 1A. The components of the system 100A can combine to determine location information about the driver device in connection with a transport service (or "trip"), determine when a potential error in data for the trip (or "trip data") exists based, at least in part, on a set of conditions being satisfied or occurring, and determine an approximate start location of the trip based, at least in part, on the location information. Logic can be implemented with various applications (e.g., software) and/or with hardware of the computing device or system that implements the system 100A.

The system 100A can be used in connection with a network service in which requesters (e.g., riders) and service providers (e.g., drivers) are matched with each other. For example, for a specified trip, the trip manage component 102 can create an entry (e.g., a trip entry) and store the entry in a trip database (e.g., in a set of databases 108). The trip manage component 102 can determine location data about the driver that is assigned for the trip as the driver progresses to a pick up location of the rider and subsequently, to a destination location of the rider. In one example, the trip manage component 102 can periodically receive location data from the driver's device over one or more networks. The driver's device can run a designated driver application that can determine the location data using a GPS receiver of the driver's device.

Still further, according to an example, the trip manage component 102 can use the location data of the driver device, associated time information, and/or associated driver state or application state information to continuously/periodically update the trip entry until the transport service is completed. In some examples, the trip manage component can also record (i) the time and the location of the driver device when the driver accepted an invitation for the trip via the driver application, (ii) the time and the location of the driver device when the driver was a predetermined distance or predetermined estimated travel time from the pickup location of the rider, and/or (iii) the time and the location of the driver device when the driver provided input on the driver application indicating that the trip has started.

The location check component 104 can perform location checks using the location data of the driver device. As described herein, a location check process can correspond to comparing a location data point with another location data point(s), determining the distance or estimated travel time the location data point is from a reference location data point, and/or determining whether the location data point is within a particular geographic location or geofence (e.g., a region defined by three or more location data points). According to examples, the location check component 104 can be configured, via one or more parameters stored in a parameters database, to determine when one or more conditions occur or are satisfied in connection with the driver's location and/or the driver's status (e.g., state of the driver application). When one or more conditions occur or are satisfied, the location check component 104 can trigger location extrapolation 130 to perform one or more operations.

The parameter manage component 106 can enable an administrative user of the system 100A to manage or configure (e.g., edit, update, delete, etc.) one or more parameters used to specify the operation(s) of the components of the system 100A (e.g., the location check component 104, the location extrapolation 130). For example, a first parameter can specify what predetermined threshold measurement the location check component is to use in order to perform a location check to determine whether a driver device is within a vicinity of the pickup location, while a second parameter can specify what predetermined threshold measurement the location check component is to use in order to perform a location check to determine whether a driver device is outside a certain distance/estimated travel time away from the pickup location.

The system 100A can determine, based on location data and/or driver inputs, whether the trip data for the trip may be inaccurate. According to an example, the system 100A determines whether the driver has indicated an incorrect location as the start location for the trip. The system 100A can enable, in one example, the driver application to display a user interface with a prompt asking the driver if the trip was started late. If the driver subsequently provides user input indicating that the transport service was started late, the location extrapolation 130 can be triggered to identify a previous location data point as the start location for that trip as opposed to the start location initially indicated by the driver.

Figure 1B:
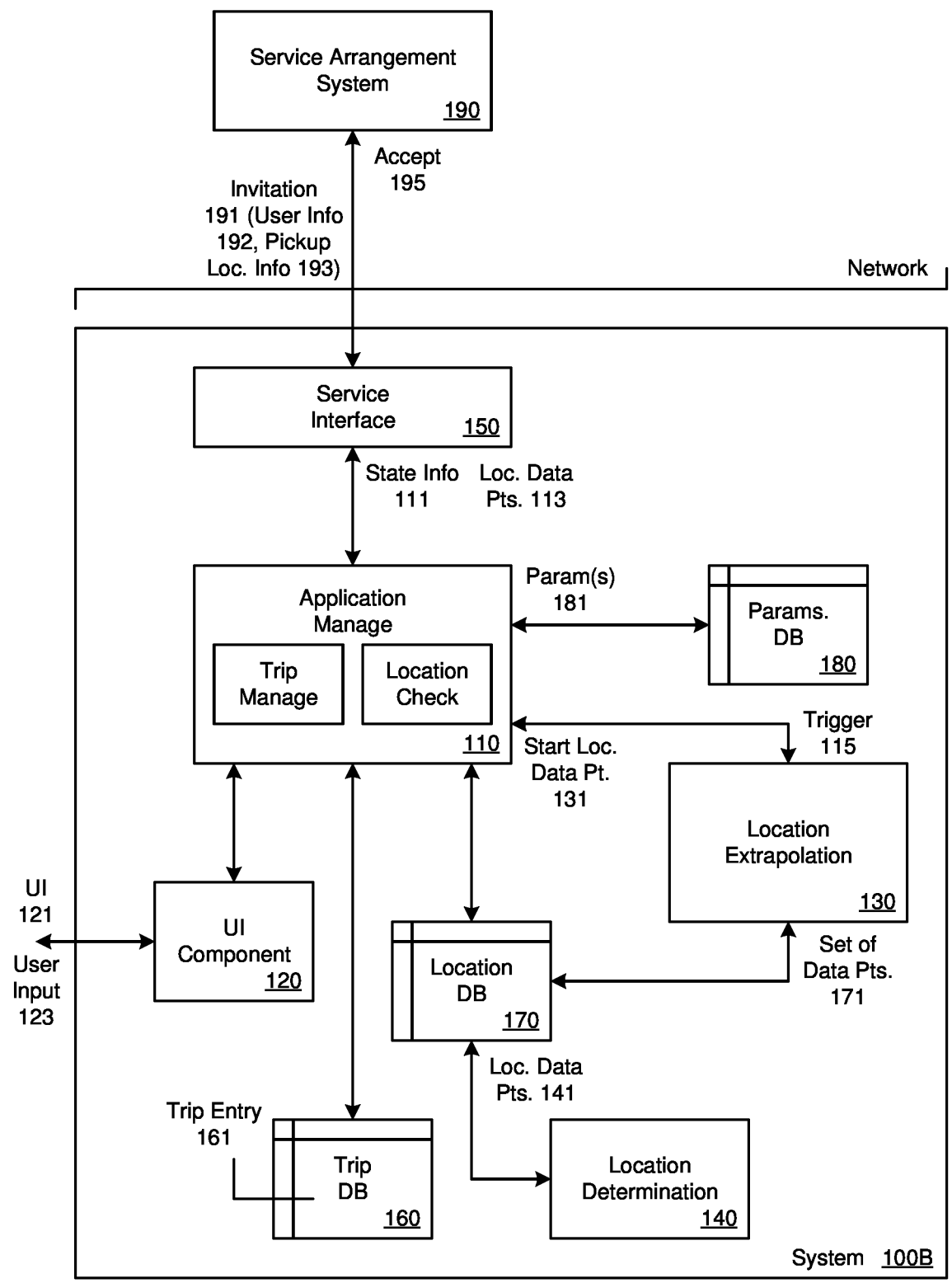

FIG. 1B illustrates an example in which the system is implemented by and operated on a mobile computing device, such as a smartphone, through execution of instructions stored in one or more memory resources of the mobile computing device. Such a mobile computing device can correspond to a driver device operated by a driver of a vehicle. As described herein, the system 100B can include, be a part of, or correspond to an application, such as a driver application, that communicates with a service arrangement system 190 over one or more networks.

According to some examples, the system 100B can include an application manage 110, a user interface (UI) component 120, a location extrapolation 130, a location determination 140, a service interface 150, and a plurality of databases, such as a transport service (trip) database 160, a location database 170, and a parameters database 180. For purpose of simplicity, other components of the system 100B, such as a device interface(s) to communicate with device components, are not illustrated in FIG. 1B. A driver of the driver device can operate the system 100B (e.g., launch and operate the driver application) in order to be assigned or receive invitations to provide transport services for riders. For example, the service arrangement system 190 can communicate with a plurality of driver devices and a plurality of rider/client devices in order to arrange transport services between riders and drivers. The service arrangement system 190 can be implemented on network side resources, such as on one or more servers or data centers, or implemented through other computer systems in alternative architectures (e.g., peer-to-peer networks, etc.). Typically, a rider can operate a rider device (not shown in FIG. 1B) to communicate with the service arrangement system 190 and make a request for a transport service at a pickup location. The service arrangement system 190 can receive the request and select a driver to provide the transport service. The service arrangement system 190 can then transmit an invitation to the selected driver, thereby providing the driver with an option to accept or reject the invitation to provide the transport service for the requesting rider.

In the example of FIG. 1B, the service arrangement system 190 has processed a request for a transport service by a rider and has selected the driver that operates the system 100B to provide the transport service for the rider. In response to selecting the driver, the service arrangement system 190 can transmit an invitation 191 to the driver device over one or more networks. The service interface 150 of the system 100B can receive the invitation 191 for processing by the system 100B. According to examples, the service interface 150 enables the system 100B to exchange data between the system 100B and the service arrangement system 190. For example, the service interface 150 can use one or more network resources of the driver device to exchange communications over one or more wireless networks (e.g., a cellular transceiver, a WLAN transceiver, etc.). The service interface 150 can include or use an application programming interface (API), such as an externally facing API, to communicate data with the service arrangement system 190. The externally facing API can provide access to the service arrangement system 190 via secure access channels over the network through any number of methods, such as web-based forms, programmatic access via restful APIs, Simple Object Access Protocol (SOAP), remote procedure call (RPC), scripting access, etc.

In some examples, the invitation 191 can include user information 192 (e.g., a rider identifier, an image of the rider, a rider's rating, etc.), pickup location information 193 of the rider (e.g., an address, a landmark, a location data point), and/or other information (e.g., destination location information, rider preferences, etc.). As described herein, a geocoordinate of the pickup location can correspond to the pickup location data point. Alternatively, the pickup location information 193 can be transmitted separately from the invitation 191. The application manage 110 of the system 100B can receive the invitation 191 via the service interface 150 and cause the UI component 120 to display a user interface 121 corresponding to the invitation 191. The driver can view the information from the invitation 191, such as the pickup location of the rider shown on a map, and provide a user input 123 to either accept or reject the invitation 191 (e.g., via user input on a touch-sensitive display of the driver device). If the driver provides user input 123 to accept the invitation 191, the application manage 110 can transmit an acceptance message 195 or acceptance data to the service arrangement system 190. The service arrangement system 190 can receive the acceptance message 195 and determine that the transport service has been arranged for the rider.

According to an example, a trip manage component of the application manage 110 can create an trip entry 161 for the transport service (e.g., a trip entry 161) for the driver when the driver accepts invitation 191. The trip entry 161 can be stored in a trip database 160 of the system 100B. Alternatively, the trip manage component can create a trip entry 161 for the transport service when the invitation 191 is initially received or can receive the trip entry 161 from the service arrangement system 190 (e.g., along with or as part of the invitation 191, or after acceptance).

As described herein, a trip entry 161 for a transport service can store information about the transport service, including, for example, a trip identifier, a rider ID, a driver ID, a time of the request, a time the driver accepted the invitation, a time the driver indicated that the transport service has begun, a time the transport service was completed, messages exchanged in connection with the transport service, the pickup location, the destination location, the location data points traveled by the driver and/or the rider, the route traveled, the duration of the transport service, the distance traveled for the transport service, the fare amount, feedback information provided by the driver and/or the rider, etc. As the driver performs the transport service (e.g., from the time the driver accepts the invitation, as the driver travels to the pickup location and subsequently, to the destination), the trip manage component can use the location information of the driver device, associated time information, and/or associated driver state or application state information to continuously/periodically update a trip entry 161 until the transport service is complete. Still further, as an addition or an alternative, the service arrangement system 190 can locally generate and store its own trip entry that corresponds to or is similar to the trip entry 161 stored in the system 100B. The trip manage component can periodically provide the above-described information about the transport service to the service arrangement system 190, e.g., via the state information 111 and/or the location data points 113.

Referring back to the example, when the driver accepts the invitation 191 to provide a transport service, the trip manage component can store, in the trip entry 161, the pickup location information of the transport service. The trip manage component can also record, in the trip entry 161, the time and the location of the driver device when the driver accepted the invitation 191. In addition, the trip manage component can determine the state of the driver or the state of the application (referred to herein as the state of the application or application state, for purpose of simplicity) and/or when changes to the application state occurred. For example, the application state may previously have been in an on-duty or available state, which corresponds to a state in which the driver can accept an invitation for a transport service. After the driver accepts the invitation 191, the trip manage component can place the application in a different state, e.g., on route state, which corresponds to the driver having accepted the invitation 191 and is traveling to pickup location of the rider. The trip manage component can store information about the application state and/or when the state change occurred in the trip entry 161.

The application manage 110 can also cause the UI component 120 to provide a user interface 121 based on the application state. For example, after the driver accepts the invitation 191, the user interface 121 can display a map showing the current location of the driver device and the pickup location, and/or navigation instructions for the driver to travel to the pickup location. The user interface 121 can also display information indicating the application state. According to some examples, the UI component 120 can also communicate with the location determination 140 of the system 100B to receive the current location data point of the driver device.

The location determination 140 can periodically determine the current location of the driver device. The location determination 140 can communicate with, e.g., via a device interface, the GPS receiver of the driver device, one or more other sensors, and/or one or more transceivers (e.g., cellular transceiver, Wi-Fi transceiver) for purpose of determining the current location data point of the driver device. For example, the location determination 140 can make a call to the GPS receiver periodically, such as every two seconds or four seconds, etc., to periodically receive a current location data point of the driver device. The location determination 140 can also determine the associated timestamp of each determined location data point of the driver device. Depending on implementation, the location determination 140 can receive a timestamp (and/or an error value) along with the location data point of the driver device from the GPS receiver. In another example, the location determination 140 can determine the timestamp of the location data point using a separate clock (e.g., an internal clock of the driver device). The location determination 140 can store the determined location data points 141 of the driver device in the location database 170.

According to examples, the location determination 140 can periodically determine the current location of the driver device so long as the system 100B is in operation (e.g., when the application is launched and is not in a suspended or power-saving state, or when the driver has indicated that he/she is on duty and available to provide transport services). In this manner, the location determination 140 can periodically determine and store the location data point 141 of the driver device in the location database 170 from a time before the invitation 191 is received, through the performance of the transport service, and even after the transport service is completed. In another implementation, the location determination 140 can also update the trip entry 161 with the location data points 141, such as when the application is operating in a particular state (e.g., location data points associated with a particular transport service can be stored with the trip entry 161 after the driver accepts the invite for the transport service until the transport service is completed).

The application manage 110 can access the location database 170 to retrieve the location data points 141. As an addition or an alternative, the location determination 140 can provide the location data points 141 to the application manage 110. For example, the trip manage component can associate some of the location data points 141 with the trip entry 161, and the location check component of the application manage 110 can perform location checks using the current location of the driver device (e.g., periodically, such as every time the location determination 140 periodically determines the current location data point of the driver device). The application manage 110 can perform one or more location checks based on one or more parameters 181 from the parameters database 180.

The parameters database 180 can store a plurality of parameters 181 that specify how the system 100B is to operate, and in particular, how the application manage 110 is to operate. For example, one or more parameters 181 can control how the location check component is to perform a location check, such as how often to perform the location check (e.g., periodically, every time a new location data point is determined for the driver device), what thresholds or measurements to use to perform the location check, what type of location check to perform during what application state, etc. An administrative user of the service arrangement system 190 can configure one or more parameters based on any of a plurality of factors, such as based on the geographic region that a driver is currently located in, what city or state or country a driver is operating in or registered to operate in, a type or class of driver (e.g., what vehicle type the driver provides transport for), etc. The administrative user can also modify or configure any of the parameters for a particular driver and/or for a group of drivers.

Depending on implementation, the parameters 181 can be initially stored with the system 100B when the application is downloaded or stored on the driver device. One or more parameters 181 can also be updated by the service arrangement system 190. For example, the service arrangement system 190 can transmit updates to the application, which store updated parameters 181, over one or more networks or using an application store, and/or can transmit updates to one or more individual parameters 181 when the application is in communication with the service arrangement system 190 (e.g., based on a schedule, periodically, based on administrative user input provided at the service arrangement system 190, etc.). In one use case example, the updated parameter 181 can be transmitted to the system 100B during an initialization process when the application is launched.

In one example, the parameters 181 can include a first parameter that specifies what predetermined threshold measurement the location check component is to use in order to perform a location check to determine whether a driver device is within a vicinity of the pickup location (e.g., determine if the driver device is within a first predetermined distance of the pickup location data point, or determine if the driver device is within a first predetermined estimated travel time away from the pickup location data point). In another example, the parameters 181 can include a second parameter that specifies what predetermined threshold measurement the location check component is to use in order to perform a location check to determine whether a driver device is outside a certain distance/estimated travel time away from the pickup location (e.g., determine if the driver device is more than a second predetermined distance from the pickup location data point, or determine if the driver device is more than a second predetermined estimated travel time away from the pickup location data point). Such parameters can be user-configurable by an administrative user of the service arrangement system 190.

As the driver travels to the pickup location in order to provide the transport service, the application manage 110 can periodically check where the driver device is relative to the pickup location. The location check component can periodically perform a check by determining whether the current location data point of the driver device is within a specified distance or estimated travel time from the pickup location data point. For example, when the application state is operating in the on route state or traveling to pickup location state, the location check component can determine if the driver device is within a first predetermined distance of the pickup location data point, or determine if the driver device is within a first predetermined estimated travel time away from the pickup location data point. In one example, the application manage 110 can include or communicate with a routing engine or mapping engine in order to perform the distance or travel time calculations (e.g., based on the shortest distance or the fastest route from the current location data point to the pickup location data point).

When the location check component determines that the driver is within the first threshold distance (e.g., 500 feet, 1000 meters, etc.) or the first estimated travel time away (e.g., 30 seconds, 1 minutes, etc.) from the pickup location data point, the application manage 110 can change the application state from the on route state to the arriving now state, which corresponds to the driver being within the vicinity of the pickup location and/or approaching the pickup location. In one example, the trip manage component can record information about the application state in the trip entry 161, along with the current location data point of the driver and the associated timestamp. The application manage 110 can also provide the state information 111 and the location data point 113 when the application state changed to the arriving now state to the service arrangement system. In addition, the application manage 110 can cause the UI component 120 to display a user interface 121 depicting the arriving now state as opposed to the on route state. According to an example, the user interface 121 that corresponds to the arriving now state (e.g., referred to herein as the arriving now user interface, for purpose of simplicity) can include a map depicting a graphic of the pickup location, and a first selectable feature that enables the driver to indicate to the application that the transport service has started (e.g., the feature can include content, such as "Begin Trip").

When the application is in the arriving now state, the driver has presumably reached the vicinity of the pickup location and is subsequently waiting, even for an instance, for the rider to enter the vehicle so that the transport service can begin. Typically, the driver may be stationary at a position for a duration of time (e.g., five seconds, ten seconds, one minute, etc.) while waiting for the rider to enter the vehicle. Such a position can typically be near the pickup location of the rider (e.g., on the street, on a driveway, next to a building, just off the curb, a parking lot, etc.). When the rider enters the vehicle, the driver would typically indicate that the transport service has begun by providing a user input on the application (e.g., select the first selectable feature on the arriving now user interface). However, in some instances, the driver may have forgotten to provide input indicating that the transport service had begun when the driver initially picked up the passenger. Instead, the driver may have provided the input at a much later time after picking up the passenger and after traveling a significant distance from the actual pickup location. In such examples, because the total fare of the transport service can be based, at least in part, on the distance traveled and/or the duration of the transport service, the driver may potentially lose out on a significant amount of money for the value of the fare, especially if the driver drove a substantial distance (e.g., one mile, two miles, etc.) and a substantial amount of time has elapsed. The system 100B can provide a mechanism to enable the driver to receive the full amount of the transport service despite forgetting to indicate the proper start time and location of the transport service by composing a complete record for the transport service.

According to some examples, when the application is in the arriving now state, the location check component can continue to determine where the driver device is with respect to the pickup location. For example, when the application is in the arriving now state, the location check component can periodically determine if and when the current location data point of the driver device is more than a second predetermined distance or a second predetermined estimated travel time away from the pickup location data point. If the driver is at or more than the second predetermined distance or the second predetermined estimated travel time away from the pickup location data point, the location check component can indicate that this second threshold has been reached or passed, e.g., by using a flag or a data bit, or storing a message, and/or can store a timestamp and the location when the second threshold was reached or passed.

In addition, the application manage 110 can communicate with the UI component 120 to determine when user input 123 is received that corresponds to the driver indicating that the transport service has begun. For example, the driver can provide such user input by selecting the first selectable feature on the arriving now user interface 121 (e.g., select "Begin Trip"). When the application manage 110 determines that the driver has indicated that the transport service has begun, the application manage 110 can determine if the second threshold has been reached or passed (e.g., identify the flag or data bit, or other stored data). As an addition or an alternative, as opposed to the location check component periodically checking whether the driver's location has reached or it passed the second threshold (the second threshold distance or the second threshold estimated travel time), the location check component can perform the check (e.g., determine where the driver device is relative to the pickup location data point) when user input 123 is received that corresponds to the driver indicating that the transport service has begun. In such an example, by checking once, as opposed to periodically performing the check, the system 100B can conserve computational and processing resources of the driver device.

If the second threshold has not been reached or passed, the application manage 110 can perform normal (default) operations for recording information about the transport service, including indicating that the transport service has started. In such an example, the driver may have indicated that the transport service started at the appropriate location and time, or at least started at a location that is close enough to the pickup location. According to an example, the normal operations can include the application manage 110 (i) changing the application state from the arriving now state to the on trip state (and storing information about the application state), (ii) recording, in the trip entry 161, the start location and the associated start time of the transport service when the user input 123 was received, and (iii) causing the UI component 120 to display a user interface 121 corresponding to the driver now being on the trip (e.g., referred to herein as the on trip user interface, for purpose of simplicity). In one example, the on trip user interface 121 can include a map and/or navigation instructions to a destination previously specified by the rider or input by the driver, and a selectable feature that the driver can select to indicate that the transport service has completed (e.g., the feature can include content, such as "End Trip").

On the other hand, if the second threshold has been reached or passed at the time the user input 123 is received from the driver indicating that the transport service has begun, the application manage 110 can operate in an alternate mode than the normal operations mode, including causing the UI component 120 to display an additional user interface 121 and causing the location extrapolation 130 to determine or extrapolate location information. For example, the additional user interface 121 can be displayed immediately after the arriving now user interface (as opposed to the on trip user interface) and can provide the driver with an option(s) to specify or verify the start location. In one example, the additional user interface 121 can include graphical and/or textual content reminding the driver not to miss out on the entire fare and/or ask the driver if the transport service started late. The additional user interface 121 can include multiple selectable features, such as a first selectable feature that the driver can select in order to indicate that the transport service should start at the current location, and a second selectable feature that the driver can select in order to indicate that the transport service actually begun at or near the requested pickup location (as opposed to the current location).

The additional user interface can provide a precautionary option to enable the driver to indicate that the transport service started at a location that was not at or near the requested pickup location. For example, after a rider makes a transport request at a particular pickup location, the rider may have moved positions or changed his or her mind as to where the rider wants to be picked up. The rider may contact the driver to arrange a different pickup location or transmit a message from the rider's device to the driver device indicating a different pickup location. In such an example, if the rider and the driver made such an arrangement, the new pickup location where the transport service initiated may be more than the second threshold distance or estimated travel time away from the initial pickup location data point that was previously provided to the system 100B.

Referring back to the example of FIG. 1B, if the driver provides input corresponding to a selection of the second selectable feature on the additional user interface (e.g., indicating that the transport service actually started at or near the general requested pickup location), the application manage 110 can trigger the location extrapolation 130 to determine or estimate the appropriate start location based on previously determined location information of the driver. According to an example, the trigger 115 can cause the location extrapolation 130 to access the location database 170 (or alternatively, the trip entry 161, in other examples) to determine a set of location data points 141, and then identify a particular location data point from the set 171 as being the start location data point of the transport service.

The rationale behind the system 100B performing the location extrapolation process is to determine a more accurate start location as opposed to simply using the pickup location data point (e.g., the location data point corresponding to the user specified pickup location). For example, the pickup location data point can correspond to the rider's current location, can correspond to an address specified by the user, or can correspond to a point within a building that the rider is/was in when making the initial transport request. Such a pickup location data point may not be an accurate or proper start location data point as it may not correspond to a position on an actual road and/or may not be the actual location where the pickup occurred (e.g., the actual pickup could have occurred 100 meters away or at a street corner as opposed to a pickup location specified in the middle of a street block). Still further, the pickup location data point in itself does not provide an accurate start time of the transport service (e.g., when the pickup occurred).

Rather than using the pickup location data point as the start location of the transport service, the location extrapolation 130 can determine a set of location data points 141 from the plurality of location data points that were previously determined and stored by the location determination 140. The location extrapolation 130 can determine the set 171 by performing one or more processes, including (i) identifying which location data points are within the first predetermined distance or the first predetermined estimated travel time away from the pickup location data point and/or which location data points are within the second predetermined distance or the second predetermined estimated travel time away from the pickup location data point, and/or (ii) determining which of those location data points are substantially identical to each other (e.g., having approximately the same latitudes and longitudes as each other). Additionally or alternatively, in one example, the location extrapolation 130 can also use the timestamps of the location data points to identify the set 171, such as a timestamp when the application manage 110 determined that the driver device is within the first threshold and/or a timestamp when the application manage 110 determined that the driver device was outside the second threshold, respectively.

As an addition or an alternative, the location extrapolation 130 can determine the set 171 by (i) determining which location data points are a third predetermined distance or a third predetermined estimated travel time away from the pickup location data point, where this third threshold is smaller than the first and second thresholds, and/or (ii) determining which of those location data points are substantially identical to each other. Still further, as an addition or an alternative, the location extrapolation 130 can determine the set 171 by (i) determining which location data points were determined when the application was operating in a particular state, e.g., the arriving now state, and/or (ii) determining which of those location data points are substantially identical to each other (e.g., having approximately the same latitudes and longitudes as each other). Regardless of implementation, the set 171 can be assumed to represent the position of the driver when the driver was stationary (e.g., waiting for the rider to enter the vehicle).

The location extrapolation 130 can then identify a particular location data point from the set of location data points 141 to designate as the start location data point 131 of the transport service. In addition, the location extrapolation 130 can identify the associated timestamp of that location data point as the start location time of the transport service. In one example, the location extrapolation 130 can identify the location data point with the most recent timestamp from the set 171 as the start location data point 131 (and the associated timestamp as the start time). In another example, the location extrapolation 130 can identify a location data point from the set 171 that is closest to the pickup location data point as the start location data point 131. Alternatively, the location extrapolation 130 can identify a location data point from the set 171 that is closest to the pickup location data point as the start location data point 131 only if there are none of the location data points in the set 171 are substantially identical to each other. Still further, in an alternate example, the location extrapolation 130 can determine an average location data point using a clustering process of the set 171 and designate the averaged location data point as the start location data point 131. The location extrapolation 130 can determine an associated timestamp for the averaged location data point as one that is the median or averaged timestamp of the set 171.

Once the application manage 110 receives the start location data point 131 and the associated timestamp, the trip manage component can designate the start location data point 131 as the start location of the transport service and the associated timestamp as the start time of the transport service. According to an example, the trip manage component can store the start location data point 131 and the associated timestamp in the trip entry 161 as the start information. The application manage 110 can also provide the start location data point 131 and the associated timestamp to the service arrangement system 190 to enable the service arrangement system 190 to record the correct information for the transport service. In this manner, the trip entry 161 can include the best estimate of the actual start location of the transport service despite the driver forgetting to indicate the start location at the appropriate time.

Still further, in some examples, the location extrapolation 130 can also associate additional location data points, from the location data points 141, as part of the transport service. For example, at the time the driver provides input on the application to indicate that transport service has begun, the driver may have traveled a distance, X, after picking up the rider. The location extrapolation 130 can identify location data points that were subsequently determined after the start location data point 131 up to the current location data point when the driver provided the input. These location data points can be indicative of the distance traveled (and time elapsed) as part of the transport service. The application manage 110 can receive this set of additional location data points and the trip manage component can also associate this set with the trip entry 161. In this manner, the trip entry 161 can provide a complete record of the transport service from the time and location at which the transport service approximately started up to the current location of the driver.

Subsequently, as the driver travels to the destination to complete the transport service, the location determination 140 can continue to update the trip entry 161 with the location data points of the driver device. Once the driver drops off the rider, the application can determine that the transport service has been completed (e.g., the driver can provide input indicating that the transport service is complete). The trip manage can update the trip entry 161 with the destination location data point (e.g., the location of the driver when the application detected that the transport service was complete) and the associated timestamp. The trip entry 161 can include the estimated start location data point and time, a plurality of location data points corresponding to the route traveled by the driver in performing the transport service, and the destination location data point and time. In this manner, the trip entry 161 can provide a comprehensive record of the transport service despite the driver incorrectly providing input signifying the start location/time of the transport service. Still further, in one example, the application manage 110 can then provide the trip entry 161 to the service arrangement system 190 to enable the service arrangement system 190 to perform a fare calculation for the rider based, at least in part, on the information provided in the trip entry 161.

As an addition or an alternative, the examples described with respect to FIG. 1B can be applied to an on-board vehicle computing device. Such an on-board vehicle computing can include an application that performs the operations described with respect to FIG. 1B.

Alternatively, components of the system can be implemented on the service arrangement system in other examples. For example, referring back to FIG. 1A, the system 100A can correspond to a service arrangement system that implements a network service, such as the service arrangement system 190 of FIG. 1B. In such an example, at least some of the components of the system can be implemented by the service arrangement system as opposed to the system 100B of the driver device.

Referring to FIG. 1A as an example of the service arrangement system, the service arrangement system can include a trip manage component 102 and a location check component 104 (e.g., similar to the trip manage component and location check component of the application manage 110 described with respect to FIG. 1B), and a location extrapolation 130. After the service arrangement system arranges a transport service between a rider and a driver, the trip manage component 102 can periodically receive location data points corresponding to the driver device location and can store the received location data points in a trip entry for the transport service. The service arrangement system can receive the location data from the driver device as the driver moves from a current location to the pickup location of the rider, and subsequently to the destination location of the rider. The trip manage component 102 can also receive status information of the driver (or the driver application) and/or receive information when the status information of the driver has changed.

As the driver progresses to the pickup location of the rider, the location check component 104 can determine whether the driver device is within a first threshold (e.g., threshold distance or threshold ETA) of the pickup location data point. If yes, the location check component 104 can indicate that the first condition has been satisfied (e.g., the driver is in the vicinity of the pickup location). The service arrangement system can also change the status of the driver/driver application and place the driver/driver application in an arriving now state from an on route state. The trip manage component 102 can include, in the trip entry, a location data point and associated timestamp when the driver is within the first threshold. The service arrangement system can also provide the status information about the driver "arriving now" to the rider device to inform the rider that the driver is approaching the pickup location or to notify the rider that the driver has arrived.

The service arrangement system can also receive information from the driver device when user input is provided on the driver device by the driver. In one example, when the driver provides input that the transport service has begun, the service arrangement system can receive information about the input and perform a location check to determine whether the driver is within or outside a second threshold of the pickup location data point. In one example, based on this location check, the service arrangement system can determine whether to intelligently cause the driver application to display an option user interface or prompt, asking the driver if he or she started the trip late (e.g., resulting in the trip data being inaccurate). If the driver is within the second threshold when the input is received, the trip manage component can store in the trip entry the location and the timestamp when information about the input is received (e.g., when the transport service started). On the other hand, if the driver is not within the second threshold when information about the input is received (e.g., the second condition has been satisfied), the service arrangement system can cause the option user interface to be displayed on the driver application. If the driver then indicates that the trip was started late, the service arrangement system can implement the location extrapolation process to identify a start location and associated start time of the transport service, such as described in FIG. 1B.

The location extrapolation 130 can (i) identify a particular location data point from a set of location data points received from the driver device to designate as the start location data point of the trip, and/or (ii) identify the associated timestamp of that location data point as the start location time of the trip. The trip manage component 102 can designate the start location data point as the start location and the associated timestamp as the start time, and store the info in the trip entry. The location extrapolation 130 can also associate additional location data points as part of the transport service to fill in the holes in the trip data, such as described in the example of FIG. 1B. Once the driver completes the trip (e.g., drops off the rider and/or provides input indicating the trip has been completed), the service arrangement system can update the trip entry with the destination location data point and the associated timestamp. The trip entry can include the designated start location data point and time, a plurality of location data points corresponding to the route traveled by the driver in performing the transport service, and the destination location data point and time. In such an example, the service arrangement system can correct any inaccuracies in trip data by determining the best-estimated actual start location and other location data points corresponding to a route or traveled by the driver in connection with performing the transport service.

The service arrangement system can include other components, such as a fare calculation component, that computes a fare or cost for the completed trip based, at least in part, on (i) the vehicle type, (ii) the price at the time the request was made or transport service was arranged, (iii) time information associated with the trip (e.g., duration from the specified start time or extrapolated start time to the end time or drop off time), and/or distance information associated the trip (e.g., from the specified start location or extrapolated start location to the end location or destination location). Accordingly, in some examples, the service arrangement system can perform a fare calculation based on an extrapolated start location and/or a start time (as opposed to a start location and/or a start time indicated by the driver), so that an accurate fare amount can be assigned to the trip. The service arrangement system can thus enable individual service providers to receive fair and accurate compensation of services rendered despite a potential mistake by a driver in failing to indicate the start of the service at the proper location and/or time.

Methodology

Figure 2A:
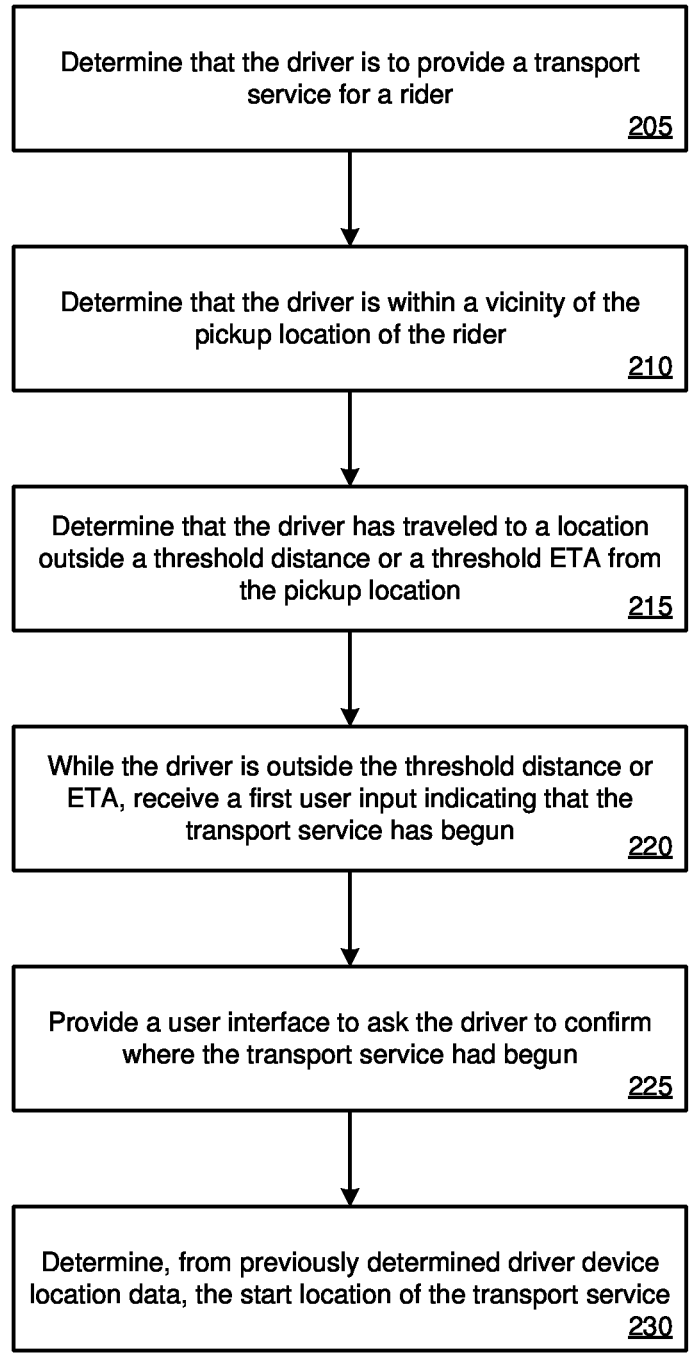
FIGS. 2A and 2B illustrate example methods for programmatically determining location information in connection with a transport service.
Figure 2B:
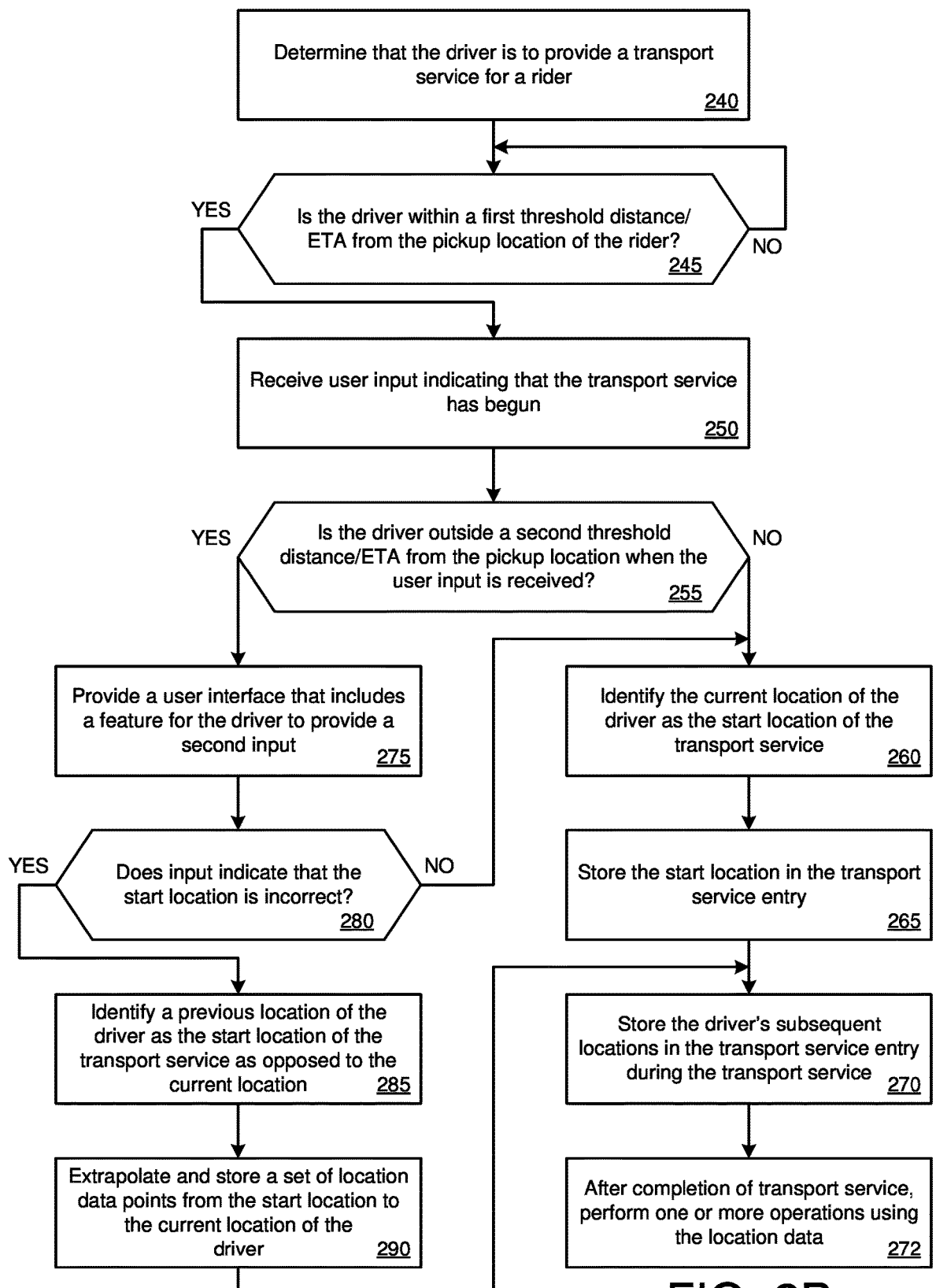

FIGS. 2A and 2B illustrate example methods of programmatically determining location information in connection with a transport service. Methods such as described by examples of FIGS. 2A and 2B can be implemented using, for example, components described with an examples of FIGS.

1A and/or 1B. Accordingly, references made to elements of FIGS. 1A and/or 1B are for purposes of illustrating a suitable element or component for performing a step or sub-step being described. For purpose of simplicity, the example method of FIG. 2A is described as being performed by the system 100B operating on the driver device. As described in FIG. 1B, the system 100B can correspond to, include, or be a part of a driver application that runs on the driver device. However, in other examples, one or more steps of FIGS. 2A and 2B (or in some examples, all the steps of FIG. 2A or FIG. 2B) can be performed by the service arrangement system 190.

Referring to FIG. 2A, the driver application can determine that the driver is to provide a transport service for a rider (205). According to one example, the driver application can receive a transport service assignment from a service arrangement system 190 that communicates with the system 100B, where the assignment instructs the driver operating the driver device to perform a task, such as to provide the transport service. In another example, the service arrangement system 190 can provide an invitation to the driver application running on the driver device that the driver can accept or reject. If the driver provides input to accept the invitation, the driver application can determine that the driver is to provide the transport service for the rider (e.g., determines that it is in an on route state). The invitation can include a user ID of the rider, a photo of the rider, a pickup location data point of the pickup location specified by the rider, and/or a destination location data point of the destination location specified by the rider.

The driver application can communicate with the GPS receiver of the driver device to periodically determine the current location of the driver device. In one example, once the transport service is arranged for the driver and the rider, the driver application can monitor the driver device in connection with the transport service. The driver application can determine, by periodically performing location checks, when the driver device is within a vicinity of the pickup location of the rider (210). According to an example, the driver application can determine whether the current location data point of the driver device is within a first predetermined distance or first predetermined estimated travel time away from the pickup location data point (e.g., a first threshold).

Subsequently, the driver application can continue to periodically determine the current location of the driver device and periodically perform location checks. The driver application can determine when the driver has traveled to a location outside a second predetermined distance or a second estimated travel time away from the pickup location data point (e.g., a second threshold) (215). In such an example, the driver presumably has arrived at or near the pickup location, has picked up the rider, and has started driving towards the rider's destination. While the driver is outside the second threshold, the driver application can receive a first user input indicating that the transport service has begun from the driver (220). In some examples, the driver application can provide a user interface that includes a selectable feature, that when selected, indicates to the driver application that the transport service has started.

In the example of FIG. 2A, the driver has provided this first user input after traveling a distance from the pickup location data point. For example, the driver may have traveled two miles after picking up the rider (and driven for three minutes) before realizing that he or she forgot to indicate that the transport service had begun. In response to receiving the first user input, the driver application can provide a confirmation user interface that includes an instruction or a request asking the driver to confirm where the transport service begun (225). For example, such a confirmation user interface can include (i) graphical and/or textual content reminding the driver not to miss out on the entire fare and/or ask the driver if the transport service started late, and (ii) a set of selectable features, including a first selectable feature that the driver can select in order to indicate that the transport service should start at the current location (e.g., the current location when the driver provided the first user input and/or when the confirmation user interface was displayed), and a second selectable feature that the driver can select in order to indicate that the transport service actually begun at or near the requested pickup location (as opposed to the current location).

In the example of FIG. 2A, the driver can provide a second user input to select the second selectable feature. In response to receiving the second user input, the driver application can determine, from previously determined driver location data points, a particular location data point as being the start location of the transport service (230). For example, the driver application can determine, from a plurality of stored location data points, a first set of location data points that are (i) are positioned within the first threshold from the pickup location and/or within the second threshold from the pickup location, and/or (ii) substantially identical to each other, and select a location data point having the most recent timestamp from the first set. This selected location data point can be designated as being the start location data point of the transport service and the associated timestamp can be designated as being the start time of the transport service. The driver application can store this information in a record for the transport service.

FIG. 2B illustrates another, more detailed, example method of programmatically determining location information in connection with a transport service. For illustrative purposes, the example method of FIG. 2B is described as being performed by a system, such as a service arrangement system described in FIG. 1A or 1B. FIG. 2B is also described in conjunction with FIGS. 3 and 4.

Figure 3:
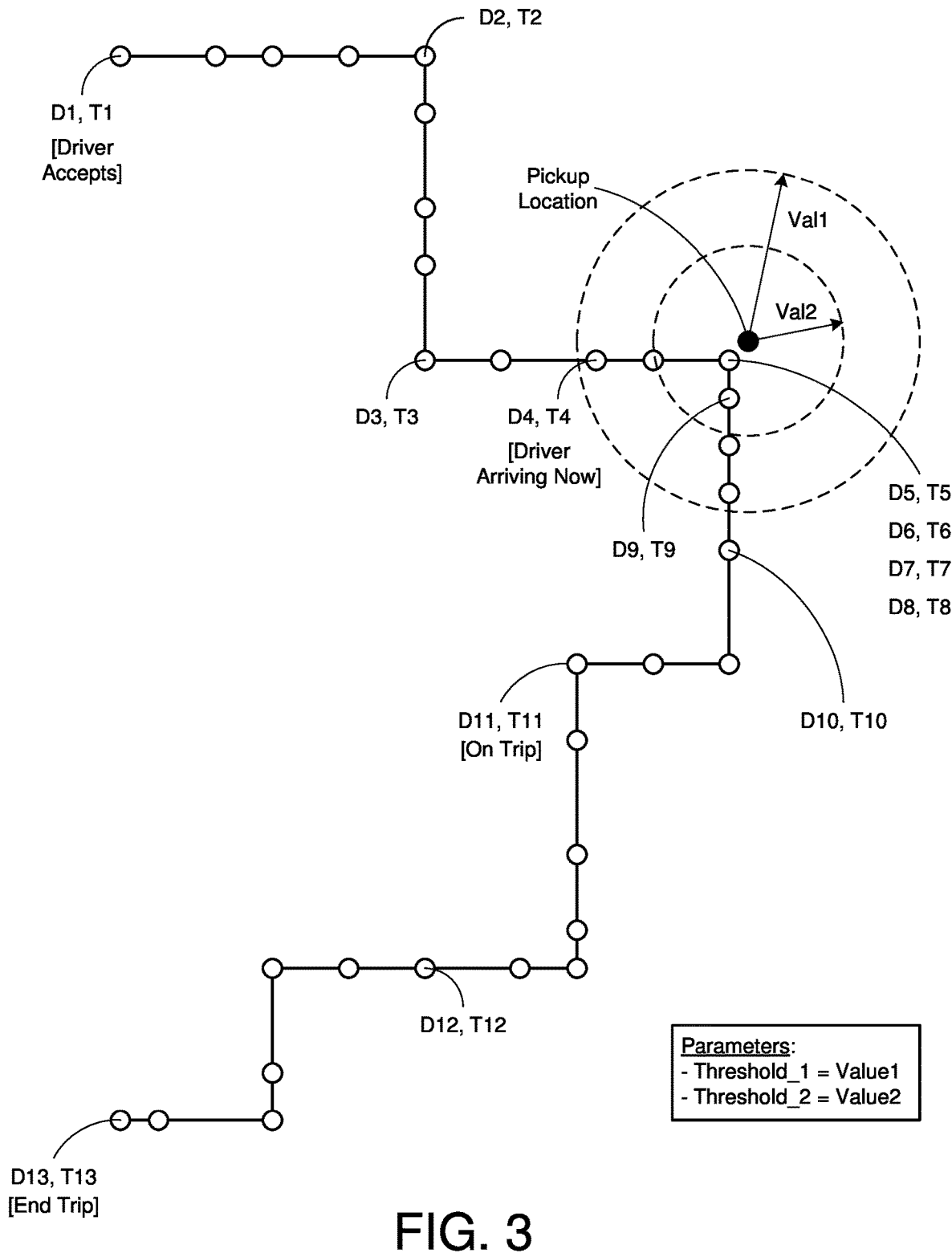
FIG. 3 is a diagram illustrating a use case example of a mobile computing device in connection with a transport service.

A service arrangement system 190 can arrange a transport service to be performed by a driver for a requesting rider, and can transmit information about the transport service to the driver device, such as an invitation message. Once the driver accepts the invitation to provide the trip, via providing input on the driver application running on the driver device, the service arrangement system 190 can determine that the transport service is arranged for the rider and the driver (240). In one example, the invitation can include a pickup location of a pickup location specified by the rider. Referring to FIG. 3, a location data point, D1, having a timestamp, T1, is illustrated representing the location and time when the driver accepted the invitation for the transport service. At this point, the driver application can be operating in an on route state, e.g., a state corresponding to the driver having been assigned the transport request and traveling to the pickup location of the rider. Information about D1 and T1 can be stored in a trip entry corresponding to the trip.

The driver application can periodically determine and store the current location of the driver device in a memory of the driver device (e.g., every two seconds, every four seconds, etc.) and can periodically transmit the location to the service arrangement system 190 over one or more networks. Depending on implementation, the service arrangement system 190 can associate periodically received location data points of the driver device with the trip entry.

Referring to FIG. 3, FIG. 3 illustrates a plurality of dots or circles (e.g., along a route represented by solid lines) that represent a plurality of determined location data points of the driver device. For purpose of simplicity, not every periodically determined location data point is illustrated in FIG. 3. The illustration in FIG. 3 provides an overview depicting the movement of the driver in connection the transport service. After the driver accepts the invitation at D1, T1, the driver application can transmit the location data points to the service arrangement system 190. The service arrangement system 190 can then monitor the driver's location (e.g., periodically) to determine whether the driver is within a first threshold distance or first threshold estimated travel time (or estimated time of arrival (ETA)) from the pickup location data point (245) (e.g., periodically perform location checks). The first threshold distance or estimated travel time can be referred to, in FIG. 3, as Threshold_1 having a Value1 and depicted as a large dotted circle. If the driver is not within Value1 of the pickup location data point, the driver application can operate in the same state (e.g., the on route state). The service arrangement system 190 can continue to check the location using the next determined location data point of the driver device.

For example, the service arrangement system 190 can determine that the location data point, D2, having a timestamp, T2 (which is subsequent in time sometime after T1), is not within Value1. The service arrangement system 190 can then repeat the location check at the next determined location data point and so forth. Again, the service arrangement system 190 can determine that the location data point, D3, having a timestamp, T3, is not within Value1. The service arrangement system 190 can then repeat the location check at the next determined location data point. Subsequently, in the example of FIG. 3, the service arrangement system 190 can determine that the location data point, D4, having a timestamp, T4, is within Value1 (e.g., has satisfied a first condition). The service arrangement system 190 can change the state of the transport service or the driver/driver application from the on route state, for example, to the arriving now state, which indicates that the driver is within the vicinity of the pickup location specified by the rider. In addition, the service arrangement system 190 can store, in the trip entry, information when the driver was within the Threshold_1, such as D4, and T4.

The service arrangement system 190 can continue to monitor the driver device, and can determine if and when user input is received indicating that the transport service has begun. Referring back to FIG. 3, the driver has stopped at the location data point, D5, having a timestamp, T5, close to the pickup location data point. The driver presumably has been stationary for at least a duration of time as subsequent location data points (D6, D7, and D8) determined in subsequent times (T6, T7, and T8, respectively) are identical or substantially identical to D5. Some amount of time after, the driver has changed positions, e.g., has traveled south to location data point D9, having a timestamp, T9 (which is subsequent in time sometime after T8).

Referring back to FIG. 2B, the service arrangement system 190 can receive a first user input of the driver via the driver application indicating that the transport service has begun (250). According to an example, the service arrangement system 190 determines whether the driver is outside a second threshold distance or second threshold estimated travel time (or ETA) from the pickup location data point when the first user input is received (255). Alternatively, the service arrangement system 190 can determine when the driver has traveled outside the second threshold and mark a time and/or a location when this occurs. The second threshold distance or estimated travel time can be referred to, in FIG. 3, as Threshold_2 having a Value2 and depicted as a smaller dotted circle. In this example of FIG. 3, Value2 is smaller than Value1, but in other examples, Value2 can be larger or equal to Value1, depending on specified parameters.

If the first user input is provided when the driver device is within Value2, such as at the location data point, D9, in FIG. 3, then the service arrangement system 190 can identify the current location of the driver (e.g., D9) as the start location of the transport service (260). In addition, the service arrangement system 190 can then change the state of the transport service or the driver from the arriving now state, for example, to the on trip state, which indicates that the driver is providing transport service for the rider (e.g., the rider has been picked up). The service arrangement system 190 can store the location data point, D9, as the start location in the trip entry of the transport service (265).

Figures 4A, 4B:
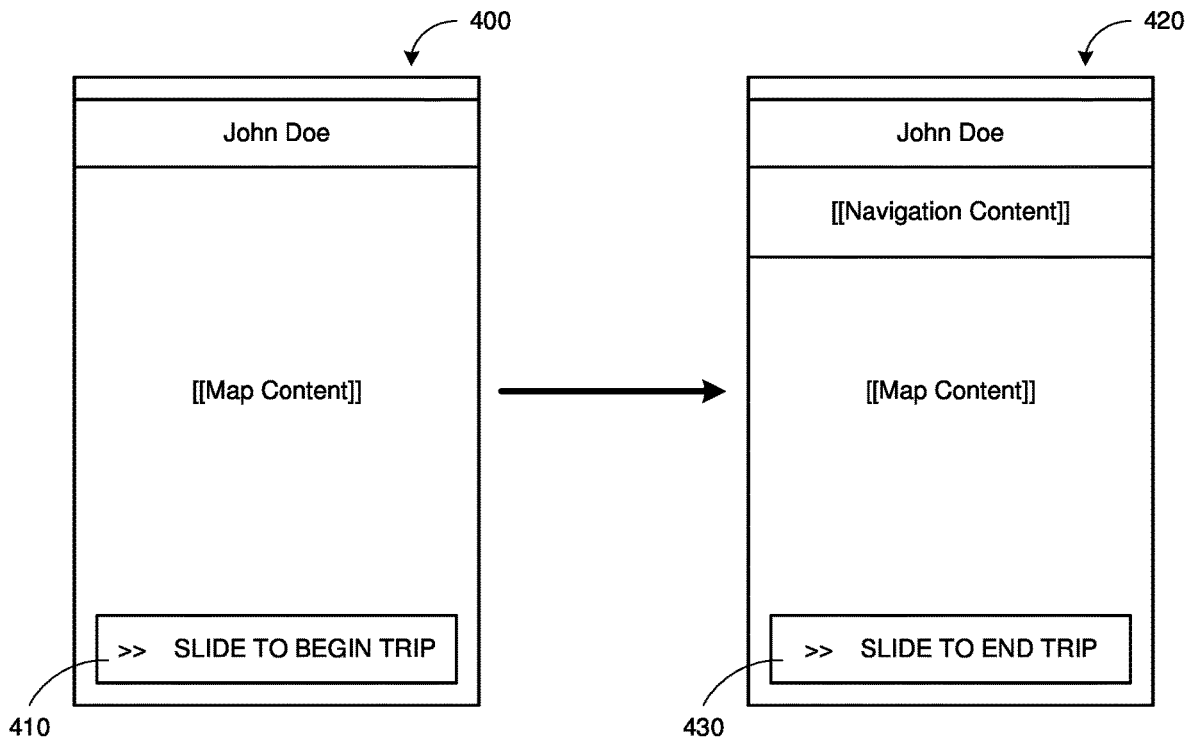
FIGS. 4A through 4D illustrate examples of user interfaces displayed on a mobile computing device in various use case examples.

For example, FIG. 4A illustrates a user interface 400 that is displayed by the driver application when the driver application state is on the arriving now state. The user interface 400 can include map content of a geographic area in which the driver is currently located and/or the pickup location data point is located. The map content can include graphic indicators representing the current location of the driver device and the pickup location of the rider, and/or can include navigation instructions to the pickup location. The user interface 400 can also include a selectable feature 410 that enables a driver to indicate to the driver application (and/or the service arrangement system) that the transport service is to begin or has just begun. If the driver is within the second threshold distance or estimated travel time, such as the location data point, D9, then the driver application can operate in a normal or default mode. In the normal mode, the driver application can (i) change the state from the arriving now state to the on trip state, for example, and (ii) display a user interface 420 of FIG. 4B, which corresponds to the driver application state being on the on trip state.

The user interface 420 can include map content that includes graphic indicators representing the driver's current position and/or the destination location of the rider. Again, the user interface 420 may also include navigation instructions to the destination location. In one example, the user interface 420 can be displayed as the driver travels to the destination location until a driver selects a selectable feature 430 that enables a driver to indicate to the driver application (and/or the service arrangement system) that the transport service has been completed. The service arrangement system 190 can also continue to periodically determine the location data point of the driver during the performance of the transport service and store the location data points (e.g., the location data points determined subsequent to the location data point, D9) in the trip entry until completion of the transport service (270). Referring to FIG. 3, the service arrangement system 190 can store the location data points determined until the location data point, D13, when the driver selects the selectable feature 430 to indicate that the transport service is complete. In response, the service arrangement system 190 can also change the driver's or driver application's state from the on trip state to an on-duty or available state, which corresponds to the driver application being ready to receive other transport service invitations.

Referring back to FIG. 2B, on the other hand, if the first user input is received by the driver application when the driver device is outside Value2 (e.g., has satisfied a second condition to trigger location extrapolation), such as at the location data point, D10, in FIG. 3, the service arrangement system 190 can cause the driver application can operate in an alternate mode (as compared to the normal mode). In the alternate mode, the service arrangement system 190 can cause the driver application to display an alternative user interface that includes a selectable feature that enables the driver to indicate whether the driver indicated an incorrect start location/time for the transport service (275). In other words, the alternative user interface provides the driver with an option to indicate that the transport service had begun at or near the pickup location as opposed to the current location, e.g., the location data point D10). For example, referring to FIG. 4C, the driver application can display a user interface 450 when the driver application state is on the arriving now state. The user interface 450 can be identical to the user interface 400 as described with respect to FIG. 4A. However, if the driver is outside the second threshold distance or estimated travel time, such as the location data point, D10, then the driver application can operate in the alternate mode, and instead of displaying the user interface 420 of FIG. 4B, the driver application can display a user interface 470 of FIG. 4D. The user interface 470 can include content, such as graphics and/or textual content, which provides additional information for the driver to answer or confirm in connection with the start location.

In one example, the user interface 470 can include a first selectable feature 480 that the driver can select in order to indicate that the transport service should start at the current location (e.g., D10), and a second selectable feature 490 that the driver can select in order to indicate that the transport service had begun at or near the pickup location data point (as opposed to the current location). In an alternate example, the user interface 470 can include a prompt, such as "did you begin the trip late?" and provide two options, NO (e.g., a first selectable feature 480) and YES (e.g., a second selectable feature 490). The driver application can determine which input is received from the driver and provide the data corresponding to the input to the service arrangement system 190 (280).

If the driver provides user input selecting a feature to indicate that the transport service has begun at the current location, e.g., the location data point, D10, then the driver application can identify the current location as being the start location of the transport service (260). The driver application can change the state from the arriving now state to the on trip state, for example, can store the current location data point as the start location in the trip entry (265), and can continue to periodically determine the location data point of the driver during the performance of the transport service and store the location data points (e.g., the location data points determined subsequent to the location data point, D10) in the trip entry until completion of the transport service (270).

Figures 4C, 4D:
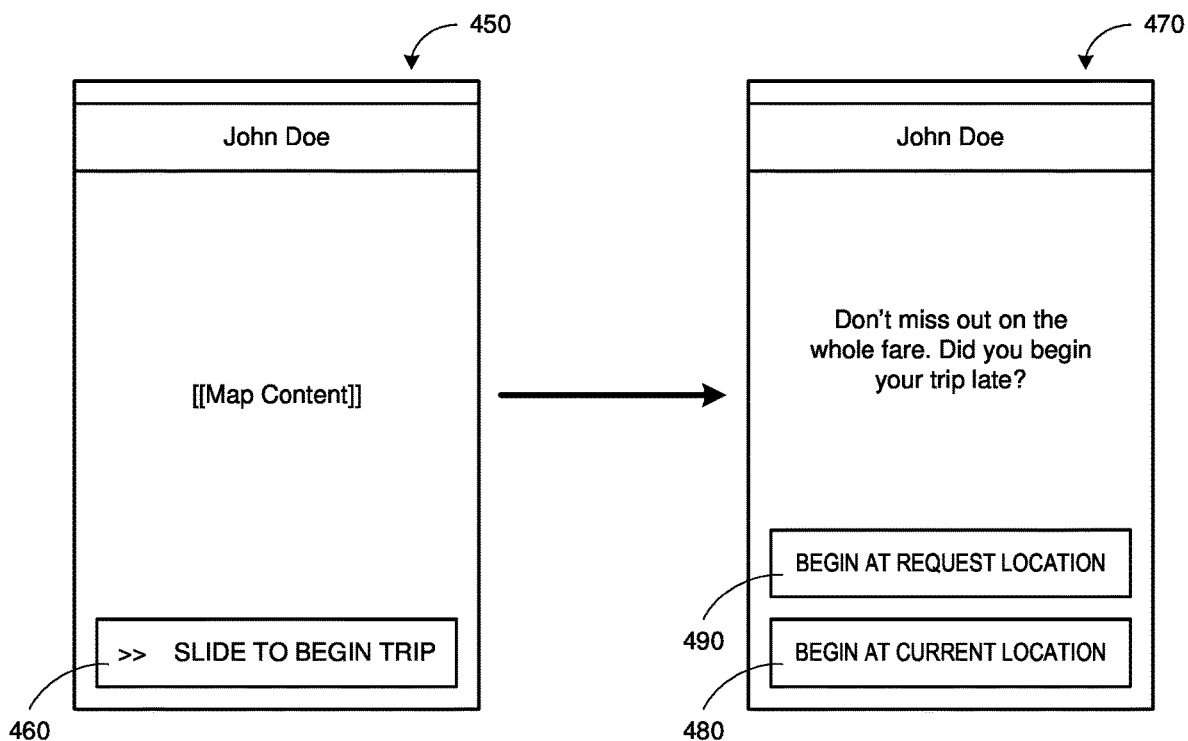

Conversely, if the driver provides user input to select the selectable feature that enables the driver to indicate that the transport service had begun at or near the pickup location (e.g., the driver selects the second selectable feature 490 on the user interface 470 of FIG. 4D), then the service arrangement system 190 performs additional processes to programmatically identify a previous location data point as being the start location of the transport service (285). For example, the service arrangement system 190 can determine, from a plurality of stored location data points (e.g., location data points from D1 to D10), a first set of location data points that are (i) are positioned within Value1 from the pickup location and/or within Value2 from the pickup location, and/or (ii) substantially identical to each other (e.g., location data points, D5 to D8). From this set of location data points, in one example, the service arrangement system 190 can select a location data point having the most recent timestamp, which in the example of FIG. 3, corresponds to location data point, D8, having the timestamp, T8. This selected location data point, D8, can be designated as being the start location data point of the transport service and the associated timestamp, T8, can be designated as being the start time of the transport service. The service arrangement system 190 can store this information in the trip entry of the transport service.

Referring to FIG. 2B, the service arrangement system 190 can also extrapolate or determine a set of location data points from the designated start location to the current location of the driver to associate with the transport service (290). For example, the service arrangement system 190 can determine, from the plurality of stored location data points (e.g., the location data points D1 to D10), a second set of location data points from the designated start location (e.g., D8) to the current location (e.g., D10) to include in the trip entry of the transport service. As such, in the example of FIG. 3, the service arrangement system 190 can identify the location data point D9, the next two location data points determined after the timestamp T9, and the location data point D10 as being associated with the transport service. The service arrangement system 190 can also determine and store (e.g., periodically) subsequent location data points until the transport service is completed (e.g., the location data points from after D10 to D13). In this manner, the service arrangement system 190 can determine a complete record of the location data points (and associated times) corresponding to the transport service, e.g., from when the transport service approximately began until its completion (270).

The service arrangement system 190 can then use the location data points from the trip entry to perform one or more other operations after completion of the transport service (272). The other operations can include determining an estimated route for the transport service, determining the fare for the transport service based on the complete record of the transport service, and/or generating a receipt for the rider and/or the driver. According to examples, the completed record can thus include data that indicates either (i) the start location and/or start time as properly indicated by the driver, and subsequent locations and times until completion of the trip, or (ii) the extrapolated start location and/or start time as determined by the service arrangement system 190, a subsequent set of extrapolated locations and times until when the driver indicated that the trip had started, and subsequently, a set of non-extrapolated locations and times until completion of the trip. The service arrangement system 190 can determine the fare based, at least in part, on the start location and start time, the route/distance traveled, the duration of the trip, and/or the destination location and end time, and can cause a payment system to charge the rider accordingly on behalf of the driver.

Hardware Diagrams

Figure 5:
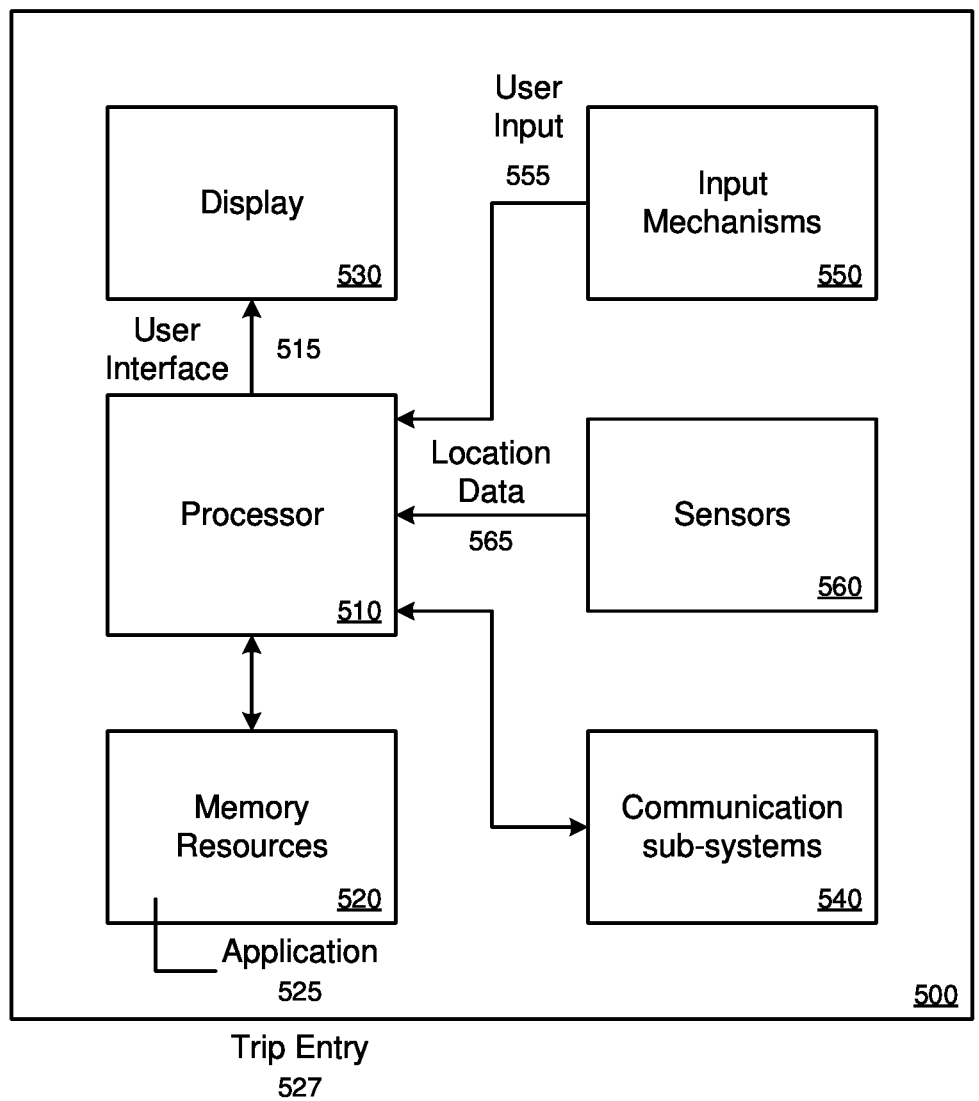
FIG. 5 is a block diagram that illustrates a mobile computing device upon which embodiments described herein may be implemented.

FIG. 5 is a block diagram that illustrates a mobile computing device upon which embodiments described herein may be implemented. In one example, a computing device 500 may correspond to a mobile computing device, such as a cellular device that is capable of telephony, messaging, and data services. The computing device 500 can correspond to a client device or a driver device. Examples of such devices include smartphones, handsets or tablet devices for cellular carriers. The computing device 500 includes a processor 510, memory resources 520, a display 530 (e.g., such as a touch-sensitive display device), one or more communication sub-systems 540 (including wireless communication sub-systems), input mechanisms 550 (e.g., an input mechanism can include or be part of the touch-sensitive display device), and one or more sensors 560, including a location detection mechanism (e.g., GPS receiver). In one example, at least one of the communication sub-systems 540 sends and receives cellular data over data channels and voice channels. The communications sub-systems 540 can include a cellular transceiver and one or more short-range wireless transceivers.

The processor 510 can provide a variety of content to the display 530 by executing instructions stored in the memory resources 520. The memory resources 520 can store instructions corresponding to the driver application 525, for example, and other data, such as one or more trip entries 527, one or more parameters, or databases of location data points. For example, the processor 510 is configured with software and/or other logic to perform one or more processes, steps, and other functions described with implementations, such as described by FIGS. 1A through 4D, and elsewhere in the application. In particular, the processor 510 can execute instructions and data stored in the memory resources 520 in order to (i) determine if a start location of the transport service, specified by the driver, is incorrect based on location information determined on the computing device 500 and/or based on user input 555 received from a driver, and (ii) to programmatically identify a particular previous location as being the start location of the transport service, as described in FIGS. 1A through 4D. The processor 510 can also execute the driver application instructions 525 to cause various user interfaces 515 to be displayed on the display 530. The user interfaces 515 can correspond to user interfaces that are displayed in connection with the transport service, including an invitation user interface, an on route user interface, an arriving now user interface, an on trip user interface, etc. Examples of the user interfaces 515 can include those described in FIGS. 1A through 4D.

In one example, the computing device 500 can periodically determine a location data point 565 of the current location of the computing device 500 from the GPS receiver. In another example, the computing device 500 can determine the current location by using one or more transceivers or a GPS receiver of the communications sub-systems 540. While FIG. 5 is illustrated for a mobile computing device, one or more examples may be implemented on other types of devices, including full-functional computers, such as laptops and desktops (e.g., PC).

Figure 6:
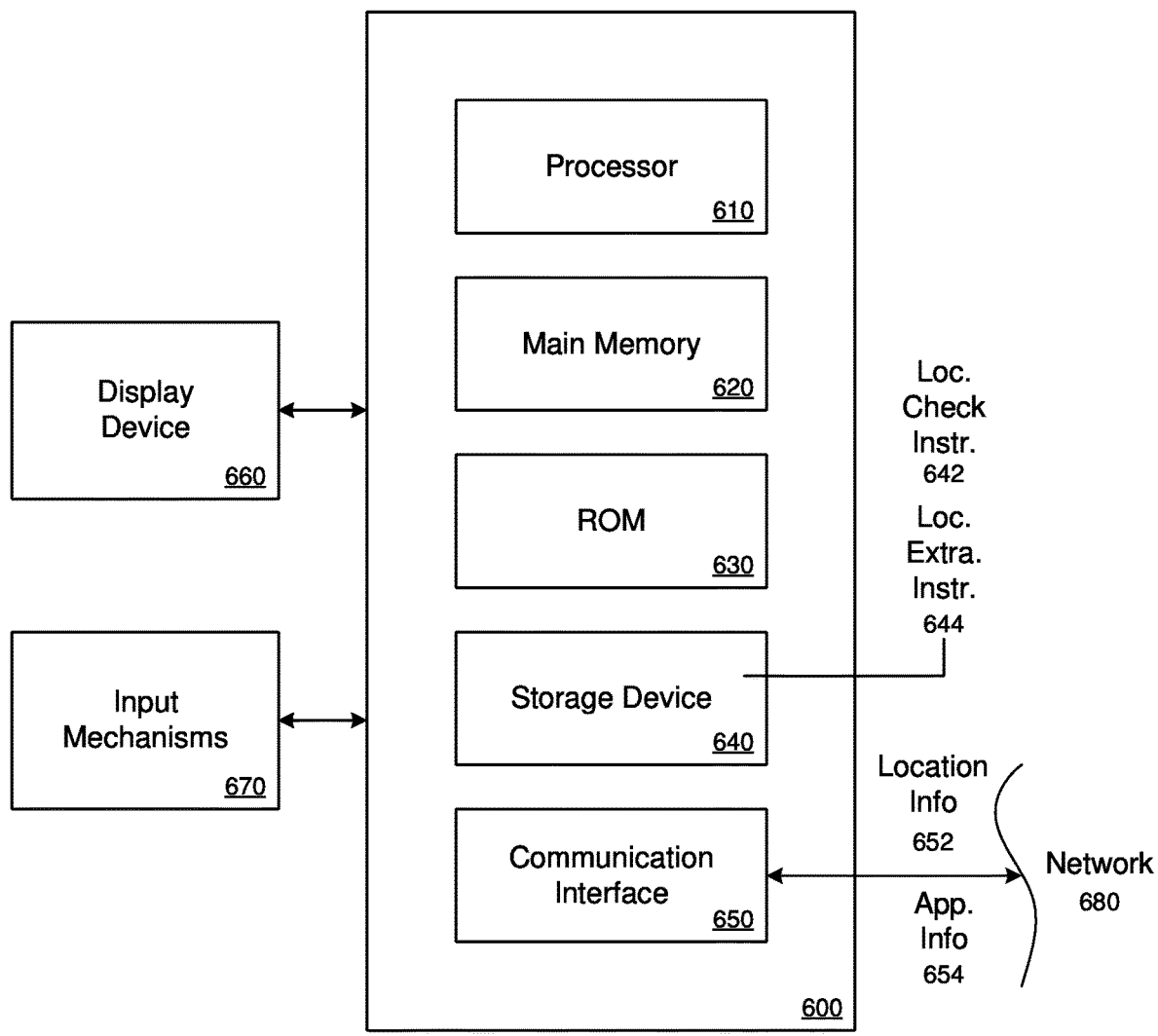
FIG. 6 is a block diagram that illustrates a computer system upon which examples described herein may be implemented.

FIG. 6 is a block diagram that illustrates a computer system upon which examples described herein may be implemented. For example, in the context of FIG. 1A, the service arrangement system 190 may be implemented using a computer system such as described by FIG. 6. The service arrangement system 190 may also be implemented using a combination of multiple computer systems as described by FIG. 6.

In one implementation, the computer system 600 includes processing resources, such as one or more processors 610, a main memory 620, a read-only memory (ROM) 630, a storage device 640, and a communication interface 650. The computer system 600 includes at least one processor 610 for processing information and the main memory 620, such as a random access memory (RAM) or other dynamic storage device, for storing information and instructions to be executed by the processor 610. The main memory 620 also may be used for storing temporary variables or other intermediate information during execution of instructions to be executed by the processor 610. The computer system 600 may also include the ROM 630 or other static storage device for storing static information and instructions for the processor 610. The storage device 640, such as a magnetic disk or optical disk, is provided for storing information and instructions. For example, the storage device 640 can correspond to a computer-readable medium that stores location check instructions 642 and location extrapolation instructions 644 for performing operations discussed with respect to FIGS. 1 through 4D. In such examples, the computer system 600 can determine if a start location of the transport service, specified by the driver, is incorrect based on location information received from a driver device, and to programmatically identify a particular previous location as being the start location of the transport service. In addition, the storage device 640 can include other instructions, such as instructions to implement a dispatch sub-system, which receives requests for transport services from riders and selects drivers to provide those transport services, and other data, such as location data of a plurality of driver devices.

The communication interface 650 can enable the computer system 600 to communicate with one or more networks 680 (e.g., cellular network) through use of the network work link (wirelessly or using a wire). Using the network link, the computer system 600 can communicate with a plurality of devices, such as the mobile computing devices of the riders and drivers. According to some examples, the computer system 600 can receive location information 652 from the driver devices and application information 654, such as the status information of drivers, from the driver devices, such as described by some examples of FIGS. 1A through 4D.

The computer system 600 can also include a display device 660, such as a cathode ray tube (CRT), an LCD monitor, or a television set, for example, for displaying graphics and information to a user. An input mechanism 670, such as a keyboard that includes alphanumeric keys and other keys, can be coupled to the computer system 600 for communicating information and command selections to the processor 610. Other non-limiting, illustrative examples of the input mechanisms 670 include a mouse, a trackball, touch-sensitive screen, or cursor direction keys for communicating direction information and command selections to the processor 610 and for controlling cursor movement on the display device 660.

Examples described herein are related to the use of the computer system 600 for implementing the techniques described herein. According to one example, those techniques are performed by the computer system 600 in response to the processor 610 executing one or more sequences of one or more instructions contained in the main memory 620. Such instructions may be read into the main memory 620 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A computer system comprising:
one or more processors;
a memory resource storing instructions that, when executed by the one or more processors, cause the computer system to:
receive, over one or more networks, location data from a computing device of a transport provider;
based on the location data, monitor a location of the transport provider as the transport provider operates a vehicle to travel towards a service location of a service request;
determine, based on monitoring the location of the transport provider, that the transport provider has not indicated at least one of a correct start location or a correct start time for fulfilling the service request; and
in response to determining that the transport provider has not indicated the at least one of the correct start location or the correct start time, use a set of the location data received from the computing device of the transport provider to determine the at least one of the correct start location or the correct start time for fulfilling the service request.

2. The computer system of claim 1, wherein the executed instructions cause the computer system to determine that the transport provider has not indicated the at least one of the correct start location or the correct start time for fulfilling the service request by determining an amount of time for the transport provider to arrive at the service location.

3. The computer system of claim 1, wherein the executed instructions cause the computer system to determine that the transport provider has not indicated the at least one of the correct start location or the correct start time for fulfilling the service request by determining, using the location data, that the transport provider travels away from the service location before the transport provider indicates at least one of a start location or a start time for fulfilling the service request.

4. The computer system of claim 3, wherein the executed instructions cause the computer system to determine that the transport provider travels away from the service location by comparing, using the location data, timestamps of multiple location data points for the transport provider.

5. The computer system of claim 1, wherein the executed instructions cause the computer system to determine that the transport provider has not indicated the at least one of the correct start location or the correct start time by determining, based on monitoring the location data, a location point at which the transport provider is stationary.

6. The computer system of claim 5, wherein the executed instructions further cause the computer system to determine a duration in which the transport provider is stationary at the location point.

7. The computer system of claim 1, wherein the executed instructions further cause the computer system to:
generate a prompt on a service application executing on the computing device of the transport provider to confirm the at least one of the correct start location or the correct start time.

8. A non-transitory computer readable medium storing instructions that, when executed by one or more processors of a computing system, cause the computing system to:
receive, over one or more networks, location data from a computing device of a transport provider;
based on the location data, monitor a location of the transport provider as the transport provider operates a vehicle to travel towards a service location of a service request;
determine, based on monitoring the location of the transport provider, that the transport provider has not indicated at least one of a correct start location or a correct start time for fulfilling the service request; and
in response to determining that the transport provider has not indicated the at least one of the correct start location or the correct start time, use a set of the location data received from the computing device of the transport provider to determine the at least one of the correct start location or the correct start time for fulfilling the service request.

9. The non-transitory computer readable medium of claim 8, wherein the executed instructions cause the computing system to determine that the transport provider has not indicated the at least one of the correct start location or the correct start time for fulfilling the service request by determining an amount of time for the transport provider to arrive at the service location.

10. The non-transitory computer readable medium of claim 8, wherein the executed instructions cause the computing system to determine that the transport provider has not indicated the at least one of the correct start location or the correct start time for fulfilling the service request by determining, using the location data, that the transport provider travels away from the service location before the transport provider indicates at least one of a start location or a start time for fulfilling the service request.

11. The non-transitory computer readable medium of claim 10, wherein the executed instructions cause the computing system to determine that the transport provider travels away from the service location by comparing, using the location data, timestamps of multiple location data points for the transport provider.

12. The non-transitory computer readable medium of claim 8, wherein the executed instructions cause the computing system to determine that the transport provider has not indicated the at least one of the correct start location or the correct start time by determining, based on monitoring the location data, a location point at which the transport provider is stationary.

13. The non-transitory computer readable medium of claim 12, wherein the executed instructions further cause the computing system to determine a duration in which the transport provider is stationary at the location point.

14. The non-transitory computer readable medium of claim 8, wherein the executed instructions further cause the computing system to:
generate a prompt on a service application executing on the computing device of the transport provider to confirm the at least one of the correct start location or the correct start time.

15. A computer-implemented method of facilitating transport, the method being performed by one or more processors and comprising:

receiving, over one or more networks, location data from a computing device of a transport provider;

based on the location data, monitoring a location of the transport provider as the transport provider operates a vehicle to travel towards a service location of a service request;

determining, based on monitoring the location of the transport provider, that the transport provider has not indicated at least one of a correct start location or a correct start time for fulfilling the service request; and in response to determining that the transport provider has not indicated the at least one of the correct start location or the correct start time, using a set of the location data received from the computing device of the transport provider to determine the at least one of the correct start location or the correct start time for fulfilling the service request.

16. The method of claim 15, wherein the one or more processors determine that the transport provider has not indicated the at least one of the correct start location or the correct start time for fulfilling the service request by determining an amount of time for the transport provider to arrive at the service location.

17. The method of claim 15, wherein the one or more processors determine that the transport provider has not indicated the at least one of the correct start location or the correct start time for fulfilling the service request by determining, using the location data, that the transport provider travels away from the service location before the transport provider indicates at least one of a start location or a start time for fulfilling the service request.

18. The method of claim 17, wherein the one or more processors determine that the transport provider travels away from the service location by comparing, using the location data, timestamps of multiple location data points for the transport provider.

19. The method of claim 15, wherein the one or more processors determine that the transport provider has not indicated the at least one of the correct start location or the correct start time by determining, based on monitoring the location data, a location point at which the transport provider is stationary.

20. The method of claim 19, wherein the one or more processors determine a duration in which the transport provider is stationary at the location point.

* * * * *